(12) United States Patent
Tsutsui et al.

(10) Patent No.: US 9,927,971 B2
(45) Date of Patent: Mar. 27, 2018

(54) ELECTRONIC APPARATUS, METHOD AND STORAGE MEDIUM FOR GENERATING CHART OBJECT

(71) Applicant: Kabushiki Kaisha Toshiba, Minato-ku, Tokyo (JP)

(72) Inventors: Hideki Tsutsui, Kawasaki Kanagawa (JP); Junichi Nagata, Tsurugashima Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 368 days.

(21) Appl. No.: 14/709,294

(22) Filed: May 11, 2015

(65) Prior Publication Data

US 2016/0162174 A1    Jun. 9, 2016

Related U.S. Application Data

(60) Provisional application No. 62/088,094, filed on Dec. 5, 2014.

(51) Int. Cl.
| | |
|---|---|
| G06F 1/16 | (2006.01) |
| G06F 3/0354 | (2013.01) |
| G06F 3/041 | (2006.01) |
| G06F 3/0488 | (2013.01) |
| G06K 9/22 | (2006.01) |
| G06K 9/00 | (2006.01) |

(52) U.S. Cl.
CPC ...... *G06F 3/04883* (2013.01); *G06F 3/03545* (2013.01); *G06K 9/00422* (2013.01); *G06K 9/222* (2013.01)

(58) Field of Classification Search
None
See application file for complete search history.

(56) References Cited

U.S. PATENT DOCUMENTS

| 5,652,802 A * | 7/1997 | Graves | B65H 3/063 382/135 |
| 5,903,666 A * | 5/1999 | Guzik | G06F 3/04883 382/179 |
| 6,088,481 A * | 7/2000 | Okamoto | G06F 3/0488 345/179 |

(Continued)

FOREIGN PATENT DOCUMENTS

| JP | H07-220023 A | 8/1995 |
| JP | 2008-108187 A | 5/2008 |
| JP | 2014-038518 A | 2/2014 |

*Primary Examiner* — Kent Chang
*Assistant Examiner* — Benjamin Morales Fernande
(74) *Attorney, Agent, or Firm* — Knobbe, Martens, Olson & Bear, LLP

(57) ABSTRACT

According to one embodiment, an electronic apparatus includes circuitry configured to execute a process for outputting a chart object corresponding to a handwritten chart. When a first stroke group extending over first and second areas in the handwritten chart does not substantially overlap any ruled lines, a character recognition result of a stroke in the first area is included in a first cell, and a character recognition result of a stroke in the second area is included in a second cell. When the first stroke group extending over the first and second areas substantially overlaps a ruled line, an object of a text box including a character recognition result of the first stroke group is added to the chart object.

12 Claims, 14 Drawing Sheets

(56) References Cited

U.S. PATENT DOCUMENTS

| | | | | |
|---|---|---|---|---|
| 2001/0049699 A1* | 12/2001 | Pratley | ............... | G06F 17/245 |
| | | | | 715/212 |
| 2009/0245654 A1* | 10/2009 | Xing | ............... | G06K 9/00422 |
| | | | | 382/203 |
| 2014/0145928 A1* | 5/2014 | Demiya | ............ | G06F 3/04883 |
| | | | | 345/156 |
| 2016/0154579 A1* | 6/2016 | Lee | ................ | G06F 3/04883 |
| | | | | 382/189 |

* cited by examiner

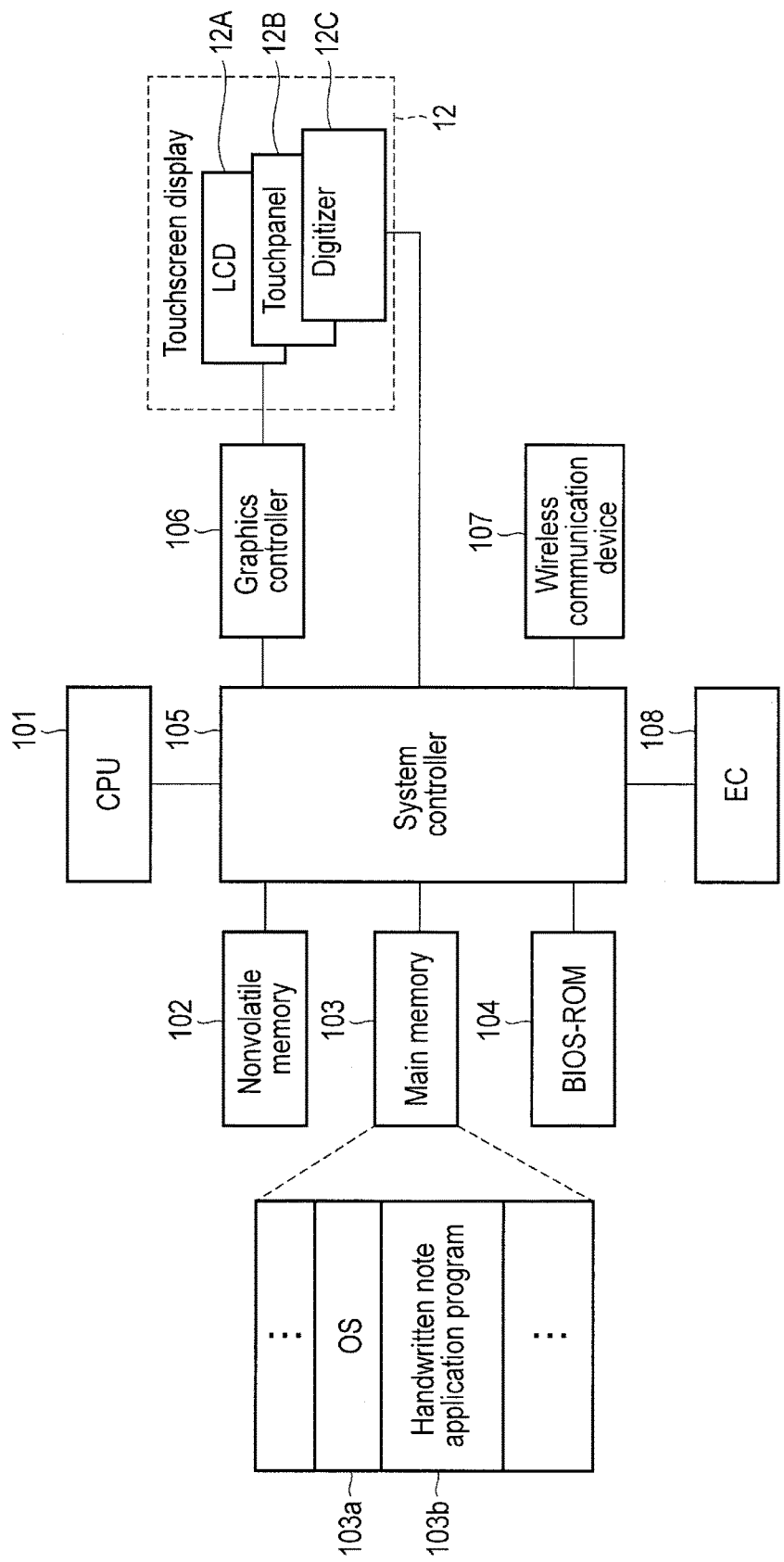
F I G. 5

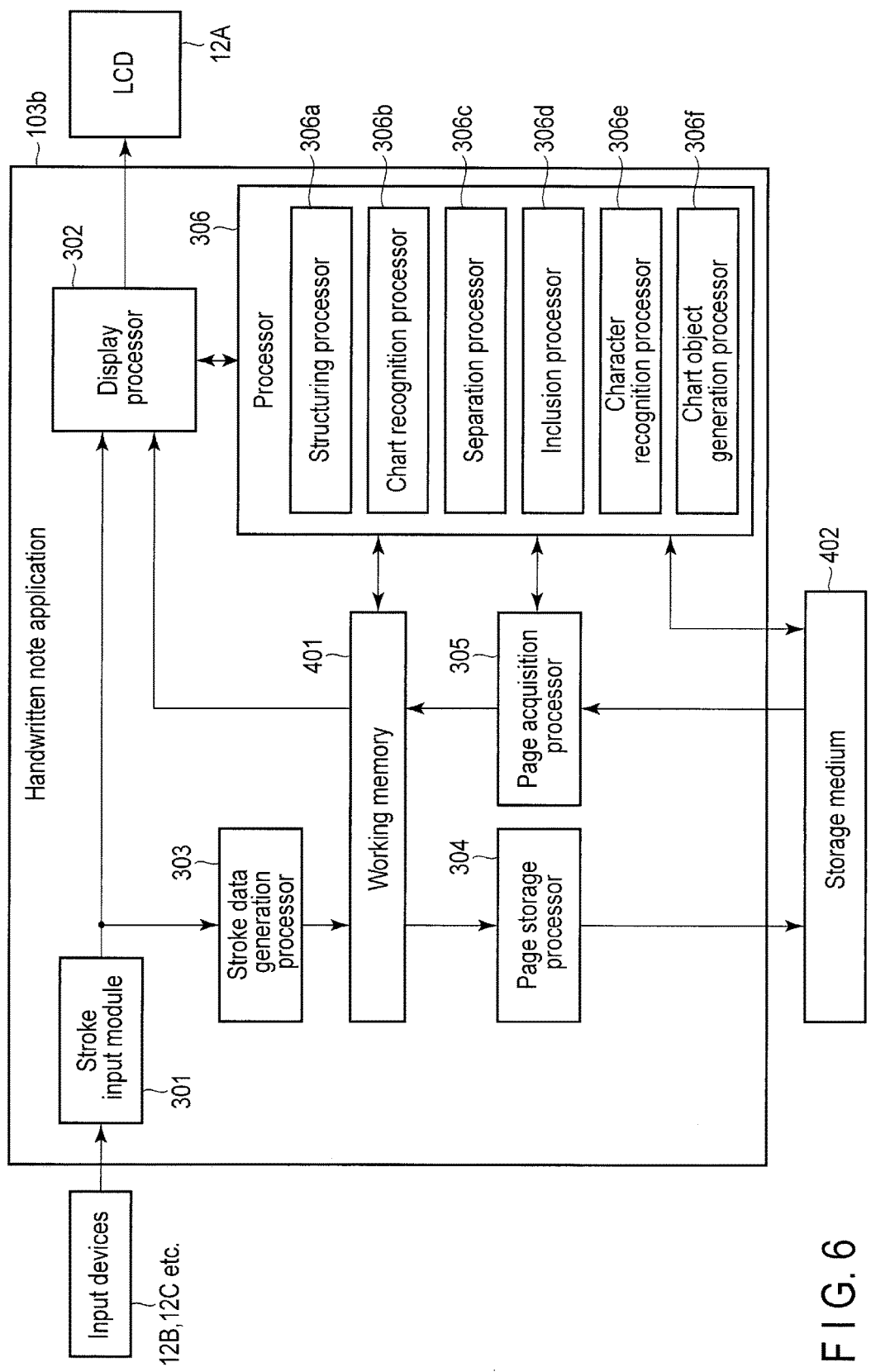
F I G. 6

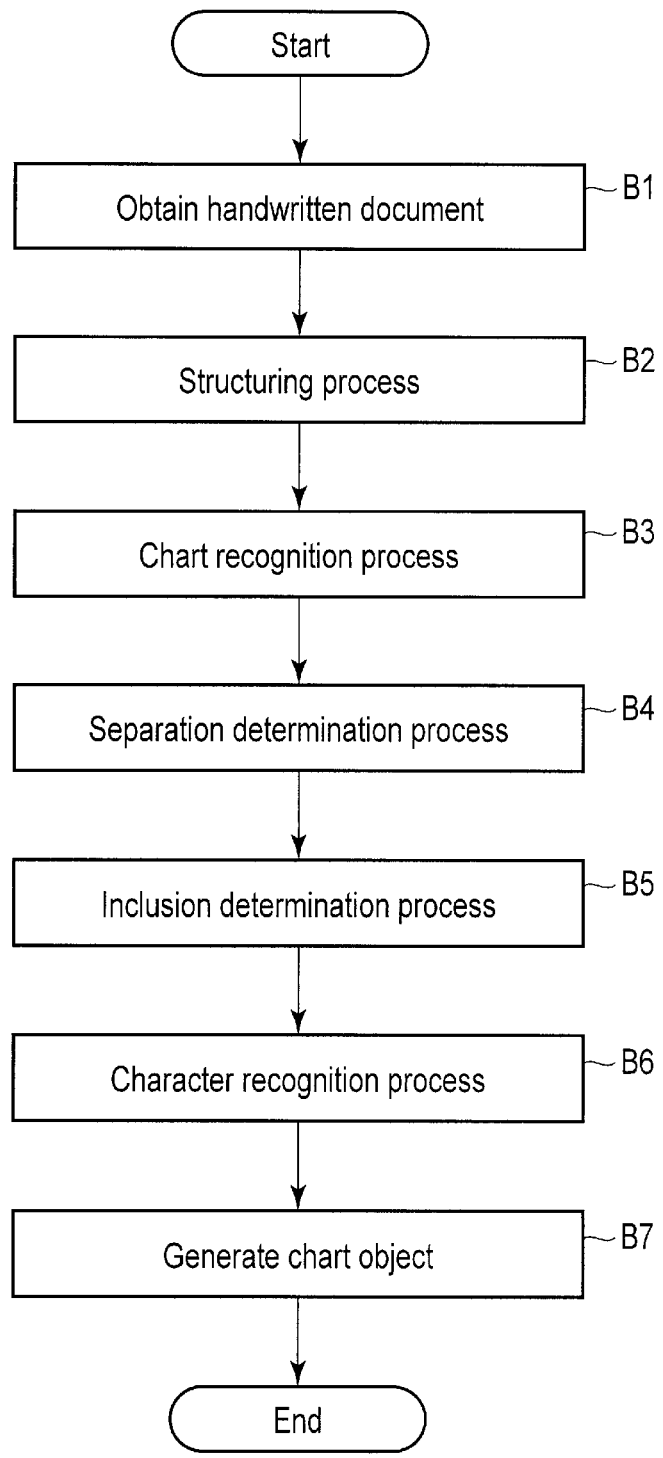
F I G. 9

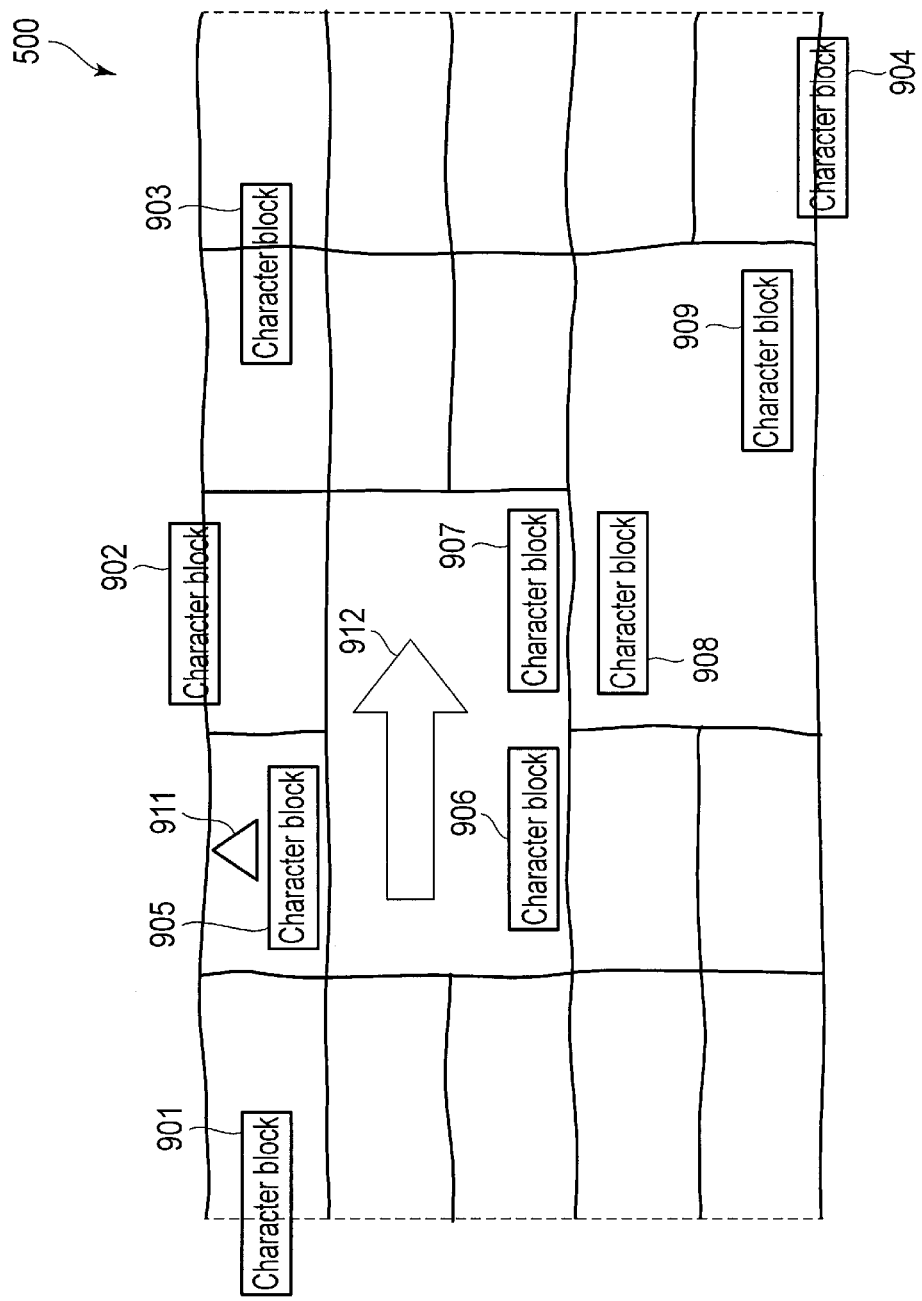
F I G. 15

ELECTRONIC APPARATUS, METHOD AND STORAGE MEDIUM FOR GENERATING CHART OBJECT

CROSS-REFERENCE TO RELATED APPLICATIONS

This application claims the benefit of U.S. Provisional Application No. 62/088,094, filed Dec. 5, 2014, the entire contents of which are incorporated herein by reference.

FIELD

Embodiments described herein relate generally to an electronic apparatus, a method and a storage medium.

BACKGROUND

In general, various types of electronic devices such as tablets, PDAs and smartphones have become widespread. Most of these devices include a touchscreen display to allow the user to easily perform an input operation.

In these devices, for example, the user can handwrite a chart including a plurality of areas (rows and columns) defined by vertical and lateral ruled lines on the screen. In the handwritten chart, a character string is input in handwriting in each area included in the chart.

Recent years have seen the development of a technique for generating a chart object (digital chart object) which includes a plurality of cells corresponding to the areas included in the handwritten chart by recognizing the chart.

However, to generate the chart object from the handwritten chart, the character string (specifically, the text corresponding to the character string) handwritten in each area included in the chart needs to be appropriately allocated for each cell included in the chart object.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is a block diagram showing an example of a configuration of the electronic apparatus.

FIG. 6 shows an example of a functional configuration of a handwritten note application program executed by the electronic apparatus.

FIG. 7 is shown for explaining an example of a case where the chart object intended by the user is not generated.

FIG. 8 is shown for explaining an example of a case where the chart object intended by the user is not generated.

FIG. 9 is a flowchart showing an example of a processing procedure of the electronic apparatus.

FIG. 15 is shown for explaining an example of a character block defined as a character block which should not be included in a cell included in a chart object.

DETAILED DESCRIPTION

Various embodiments will be described hereinafter with reference to the accompanying drawings.

In general, according to one embodiment, an electronic apparatus includes circuitry configured to display a handwritten chart including handwritten strokes on a screen. The strokes include vertical ruled lines and lateral ruled lines. The vertical and lateral ruled lines form a first area and a second area substantially surrounded by the vertical and lateral ruled lines. The circuitry is further configured to execute a process for outputting a chart object corresponding to the handwritten chart. The chart object includes a first cell corresponding to the first area and a second cell corresponding to the second area. When a first stroke group including characters extends over the first and second areas, and the first stroke group does not substantially overlap any ruled lines, a second character recognition result regarding a second stroke of the first stroke group in the first area is included in the first cell, and a third character recognition result regarding a third stroke of the first stroke group in the second area is included in the second cell. When the first stroke group extends over the first and second areas, and the first stroke group substantially overlaps a ruled line, an object of a text box including a first character recognition result regarding the first stroke group is added to the chart object.

Figure 1:
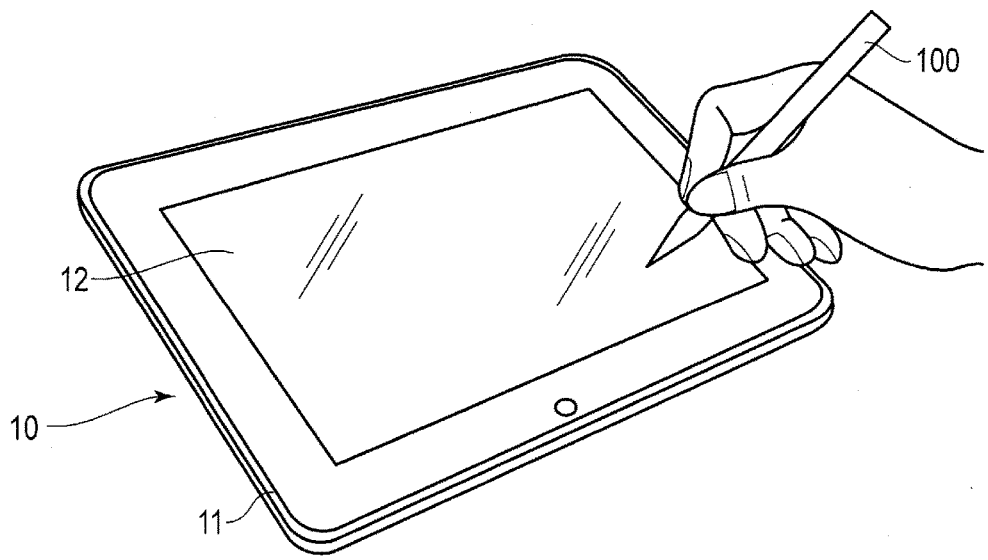
FIG. 1 is a perspective view showing an example of the external appearance of an electronic apparatus according to an embodiment.

FIG. 1 is a perspective view showing the external appearance of an electronic apparatus according to an embodiment. The electronic apparatus is, for example, a stylus-based portable electronic apparatus which enables the user to input data in handwriting by a stylus or a finger. The electronic apparatus can be realized as, for example, a tablet computer, a notebook computer, a smartphone or a PDA. FIG. 1 shows an example in which the electronic apparatus is realized as a tablet computer. In the explanation below, the electronic apparatus of the present embodiment is realized as a tablet computer. The tablet computer is a portable electronic apparatus which is also called a tablet or a slate computer.

As shown in FIG. 1, a tablet computer 10 includes a main body 11 and a touchscreen display 12. The main body 11 includes a housing having a thin-box shape. The touchscreen display 12 is attached so as to overlap the upper surface of the main body 11.

A flat-panel display and a sensor are incorporated into the touchscreen display 12. The flat-panel display includes, for example, a liquid crystal display (LCD). The sensor detects the contact position of a stylus or a finger on the screen of the flat-panel display. For the sensor, for example, an electromagnetic induction type of digitizer or a capacitive touchpanel may be used. In the explanation below, both of the two sensors, which are a digitizer and a touchpanel, are incorporated into the touchscreen display 12.

For example, the digitizer is allocated under the screen of the flat-panel display. For example, the touchpanel is allocated on the screen of the flat-panel display. The touchscreen display 12 is configured to detect a touch operation with a finger relative to the screen as well as a touch operation with a stylus 100 relative to the screen. For the stylus 100, for example, a digitizer stylus (electromagnetic induction stylus), an active stylus or a passive stylus may be employed.

The user can perform a handwriting input operation on the touchscreen display 12, using the stylus 100 (or a finger). During the handwriting input operation, the path of movement of the stylus 100 on the screen is drawn in real time. In short, a stroke is drawn. The path of movement of the stylus 100 in the period of contact of the stylus 100 on the screen is equivalent to one stroke. The assembly of many strokes corresponding to characters, charts and drawings written (input) by hand constitutes a handwritten document.

In the present embodiment, the handwritten document is not stored as image data. Instead, the handwritten document is stored in a storage medium as time-series data indicating the coordinate columns of the path of each stroke and the order relationships of strokes. The detail of time-series data is explained later. Briefly speaking, time-series data includes a plurality of stroke data items corresponding to a plurality of strokes, respectively. Each stroke data item corresponds to a stroke and includes a series of coordinate data items (time-series coordinates) each corresponding to a point on the stroke. The order in which the stroke data items are arranged is equivalent to the order in which the strokes were handwritten (in short, the writing order).

The tablet computer 10 is configured to read an arbitrary existing time-series data item from the storage medium and display a handwritten document corresponding to the time-series data item on the screen. In other words, the tablet computer 10 is configured to display a plurality of strokes indicated by the time-series data item on the screen. The tablet computer 10 has an edit function. For example, the edit function allows the user to delete, copy, cut or move an arbitrary stroke (an arbitrary handwritten character, chart or drawing, etc.) in the handwritten document which is displayed in progress by an eraser tool, a selection (range selection) tool and other various tools. The edit function further includes a function for undoing some handwriting operations and a function for redoing some handwriting operations.

The tablet computer 10 also has a recognition function for recognizing a handwritten document. The recognition function includes a character recognition function, a chart recognition function and a drawing recognition function, etc. Each of these recognition functions allows a handwritten object (a handwritten character, chart or drawing) to be converted into a digital object (digital graphical object). The digital object may be output as formatted digital data. The formatted digital data is a data file having a file format which can be used by other application programs such as an office application. Hereinafter, a character (string), chart and drawing written by hand are referred to as a handwritten character (string), chart and drawing, respectively.

Figure 2:
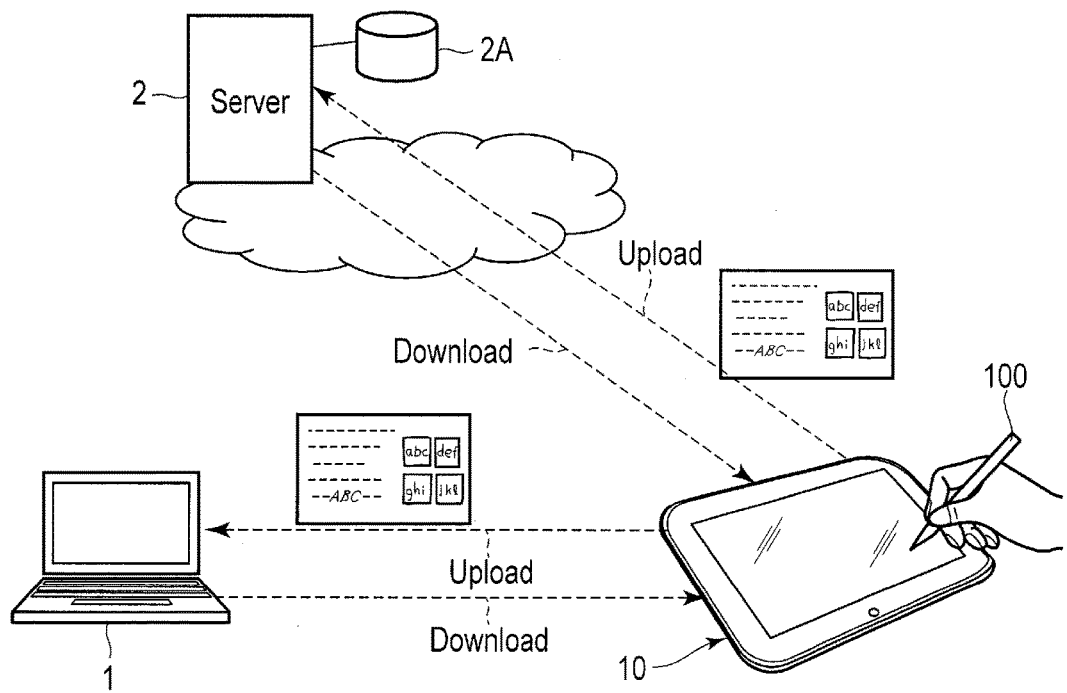
FIG. 2 shows an example of cooperation between the electronic apparatus and an external device.

FIG. 2 shows an example of cooperation between the tablet computer 10 and an external device. The tablet computer 10 is configured to cooperate with a personal computer 1 and the cloud. The tablet computer 10 includes a wireless communication device such as a wireless LAN and is configured to wirelessly communicate with the personal computer 1. The tablet computer 10 is further configured to communicate with a server 2 on the Internet. The server 2 may be a server which executes an online storage service and other various cloud computing services.

The personal computer 1 includes a storage device such as a hard disk drive (HDD). The tablet computer 10 is configured to transmit time-series data (a handwritten document) to the personal computer 1 via a network and store the data in the HDD of the personal computer 1 (this process may be referred to as upload).

The tablet computer 10 is further configured to read at least one arbitrary handwritten document stored in the HDD of the personal computer 1 (this process may be referred to as download). The tablet computer 10 is configured to display each of the strokes included in the read document on the screen of the touchscreen display 12 of the tablet computer 10.

As described above, the other party with which the tablet computer 10 communicates may not be the personal computer 1 and may be the server 2 on the cloud which provides a storage service, etc. The tablet computer 10 is configured to transmit a handwritten document to the server 2 via a network and store the document in a storage device 2A of the server 2 (this process may be referred to upload). The tablet computer 10 is further configured to read an arbitrary handwritten document stored in the storage device 2A of the server 2 (this process may be referred to as download). The tablet computer 10 is configured to display each of the strokes indicated by the read document on the screen of the touchscreen display 12 of the tablet computer 10.

In the present embodiment, the storage medium in which a handwritten document is stored may be any one of the storage device of the tablet computer 10, the storage device of the personal computer 1 and the storage device of the server 2.

Figure 3:
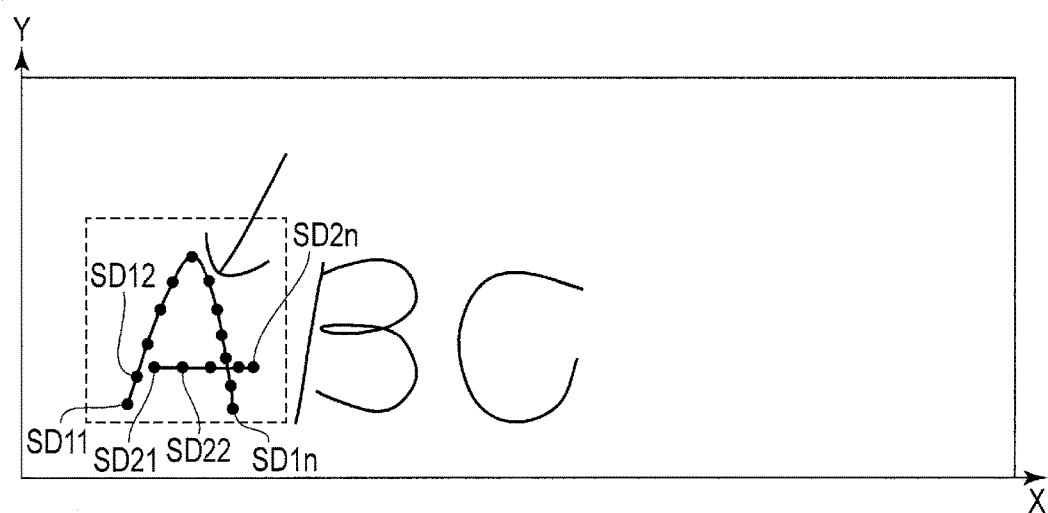
FIG. 3 shows an example of a handwritten document handwritten onto a touchscreen display of the electronic apparatus.
Figure 4:
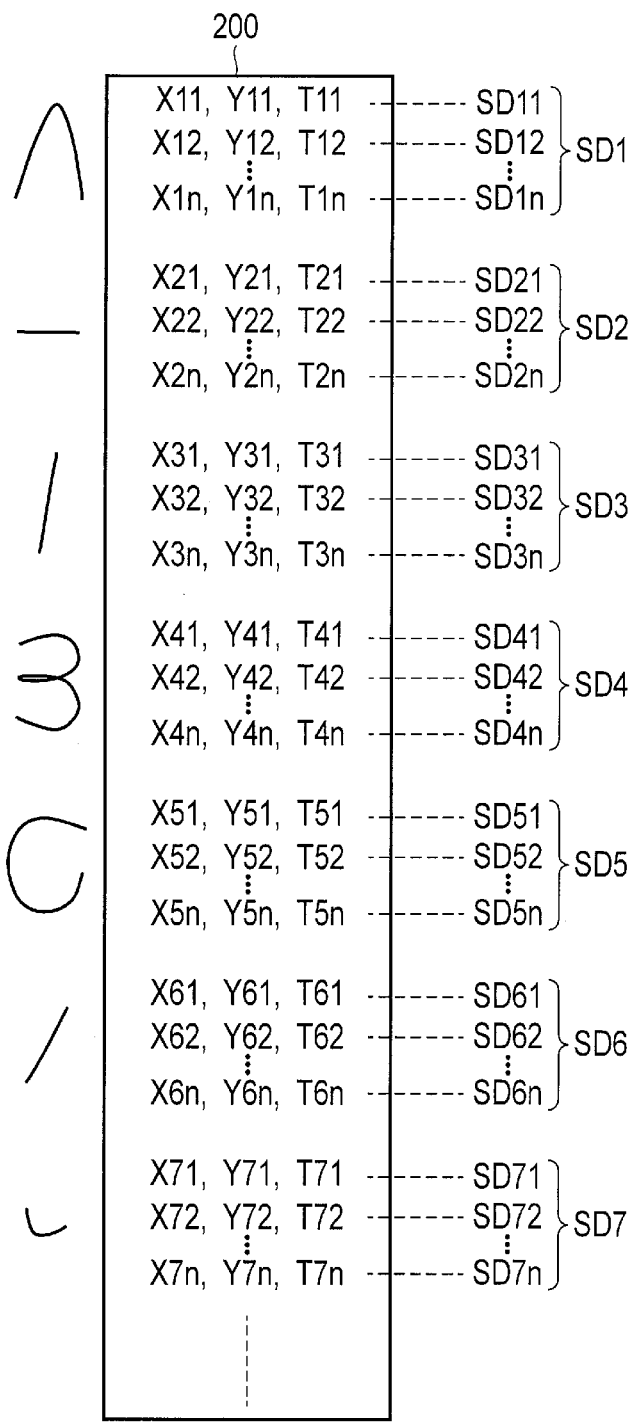
FIG. 4 is shown for explaining an example of time-series data corresponding to the handwritten document.

Now, this specification explains the relationship between a stroke made by the user and a handwritten document, referring to FIG. 3 and FIG. 4. FIG. 3 shows an example of a character string handwritten on the touchscreen display 12 by using the stylus 100 (or a finger).

In many cases, a character or drawing is handwritten in a document, and another character or drawing is handwritten on the character or drawing which has been already written. In FIG. 3, the character string "ABC" is handwritten in the order of "A", "B" and "C", and subsequently, an arrow is handwritten in vicinity to the handwritten character "A".

The handwritten character "A" is shown by two strokes (the stroke having the shape of "Λ" and the stroke having the shape of "-") made by using the stylus 100. For example, the first stroke having the shape of "Λ" is sampled in real time at equal time intervals. Through this process, the time-series coordinates (SD11, SD12, . . . , SD1$n$) of the stroke having the shape of "Λ" can be obtained. The subsequent stoke having the shape of "-" is also sampled in real time at equal time intervals. Through this process, the time-series coordinates (SD21, SD22, . . . , SD2$n$) of the stroke having the shape of "-" can be obtained.

The handwritten character "B" is shown by two strokes made by using the stylus 100. The handwritten character "C" is shown by one stroke made by using the stylus 100. The handwritten arrow is shown by two strokes made by using the stylus 100.

FIG. 4 shows time-series data 200 (specifically, the data structure of the time-series data 200) corresponding to the handwritten character string shown in FIG. 3. The time-series data 200 includes a plurality of stroke data items SD1, SD2, . . . , SD7. In the time-series data 200, stroke data items SD1, SD2, . . . , SD7 are arranged in the writing order; that is, the chronological order in which the strokes were handwritten.

In the time-series data 200, the first two stroke data items (SD1 and SD2) indicate the two strokes of the handwritten character "A". The third and fourth stroke data items (SD3 and SD4) indicate the two strokes constituting the handwritten character "B". The fifth stroke data item (SD5) indicates the stroke constituting the handwritten character "C". The sixth and seventh stroke data items (SD6 and SD7) indicate the two strokes constituting the handwritten arrow.

Each stroke data item includes a plurality of coordinates corresponding to a plurality of points on the stroke, respectively. In each stroke data item, a plurality of coordinates are arranged in chronological order in which the stroke was handwritten. For example, with regard to the handwritten character "A", stroke data item SD1 includes a series of coordinate data items (time-series coordinates) each corresponding to a point on the stroke having the shape of "Λ" of the character "A". In other words, stroke data item SD1 includes n coordinate data items (SD11, SD12, . . . , SD1n). Stroke data SD2 includes a series of coordinate data items each corresponding to a point on the stroke having the shape of "-" of the character "A". In other words, stroke data item SD2 includes n coordinate data items (SD21, SD22, . . . , SD2n). The number of coordinate data items may differ depending on the stroke data item.

Each coordinate data item indicates the X- and Y-coordinates corresponding to a point on the corresponding stroke. For example, coordinate data item SD11 indicates the X-coordinate (X11) and the Y-coordinate (Y11) of the starting point of the stroke having the shape of "Λ". SD1n indicates the X-coordinate (X1n) and the Y-coordinate (Y1n) of the end point of the stroke having the shape of "Λ".

Each coordinate data item may further include time stamp data T corresponding to the time when the point corresponding to the coordinates was handwritten. The time when the point was handwritten may be an absolute time (for example, year/month/day/hour/minute/second) or a relative time based on a time point. For example, the absolute time when the user started writing a stroke may be added as time stamp data to the corresponding stroke data item. The relative time indicating the difference from the absolute time may be added as time stamp data T to each coordinate data item of the stroke data item.

Moreover, data Z indicating the writing pressure may be added to each coordinate data item.

FIG. 5 shows a configuration of the tablet computer 10. As shown in FIG. 5, the tablet computer 10 includes, for example, a CPU 101, a nonvolatile memory 102, a main memory 103, a BIOS-ROM 104, a system controller 105, a graphics controller 106, a wireless communication device 107 and an EC 108. In the tablet computer 10, the touchscreen display 12 shown in FIG. 1 includes an LCD 12A, a touchpanel 12B and a digitizer 12C.

The CPU 101 is a processor configured to control the operations of various components of the tablet computer 10. The processor includes a processing circuitry. The CPU 101 executes various computer programs loaded from the nonvolatile memory 102 which is a storage device to the main memory 103. The programs include an operating system (OS) 103a and various application programs. The application programs include a handwritten note application program 103b. For example, the handwritten note application program 103b is a digital notebook application program which allows the user to take notes. The handwritten note application program 103b has a function for preparing and displaying a handwritten document, a function for editing a handwritten document and a function for recognizing a handwritten document, etc.

The CPU 101 executes a Basic Input/Output System (BIOS) stored in the BIOS-ROM 104. The BIOS is a program for hardware control.

The system controller 105 is a device configured to connect a local bus of the CPU 101 and various components. The system controller 105 includes a built-in memory controller configured to control the access to the main memory 103. The system controller 105 has a function for communicating with the graphics controller 106 through a serial bus conforming to the PCI EXPRESS standard, etc.

The graphics controller 106 is a graphics processing unit configured to control the LCD 12A used as a display monitor of the tablet computer 10. The graphics controller 106 includes a display control circuit. When the handwritten note application program 103b is executed, the graphics controller 106 is configured to display a handwritten document including a plurality of strokes on the screen of the LCD 12A under the control of the handwritten note application program 103b. A display signal generated by the graphics controller 106 is sent to the LCD 12A. The LCD 12A displays a screen image based on the display signal. The touchpanel 12B is provided on the LCD 12A. The graphics controller 106 may be incorporated into the CPU 101.

The wireless communication device 107 is a device configured to perform wireless communication by using, for example, a wireless LAN or 3G mobile communication. The wireless device 107 includes a transmitter configured to transmit a signal and a receiver configured to receive a signal.

The EC 108 is a single-chip microcomputer including an embedded controller for power management. The EC 108 has a function for switching the tablet computer 10 on or off in response to the operation of the power button by the user.

The tablet computer 10 may includes peripheral interfaces for communicating with other input devices such as a mouse and a keyboard.

Now, this specification explains some characteristics of the handwritten note application program 103b.

The handwritten note application program 103b allows the user to make a stroke by the stylus 100. The handwritten note application program 103b is configured to cause the tablet computer 10 to operate in a touch input mode. In the touch input mode, the handwritten note application program 103b allows the user to make a stroke by a touch operation (finger gesture) or a mouse. The touch input mode is a mode for making a stroke by a finger or a mouse. The user can turn the touch input mode on or off.

Now, this specification explains a page input/edit function.

In the handwritten note application program 103b, the user can select an arbitrary handwritten object (at least one stroke) on the page or select the whole page by a selection (range selection) tool.

The handwritten note application program 103b supports a copy/cut/paste function. In the copy/cut/paste function, the clipboard function of the OS may be used. The clipboard is a temporary storage area for exchanging data between application programs. The handwritten note application program 103b is configured to perform, for example, the following four types of copies.

"Copy": The handwritten note application program 103b copies (stores) the selected handwritten object as stroke data into the clipboard. The stroke data includes the coordinates of a plurality of points corresponding to the stroke. The application in which the data is pasted is the handwritten note application program 103*b*.

"Copy as an image": The handwritten note application program 103*b* copies (stores) the selected handwritten object as an image (image data) into the clipboard. The image is, for example, a bitmap. The handwritten note application program 103*b* converts the selected handwritten object to image data and copies the image data into the clipboard. The application program in which the data is pasted is an application program which deals with images.

"Copy as office data": The handwritten note application program 103*b* copies (stores) the selected handwritten object (the selected handwritten character string, chart or drawing, etc.) as a digital object into the clipboard. The digital object may be a formatted digital object; that is, a data file having a file format which can be dealt with by another application program. The handwritten note application program 103*b* converts the selected handwritten object to a digital object and copies the digital object as a formatted digital object into the clipboard. The application program in which the object is pasted is a presentation application program, a word processing application program or a spreadsheet application program, etc.

The process for converting the selected handwritten object to a digital object is executed by using character recognition, chart recognition and drawing recognition. In character recognition, the group of strokes corresponding to a handwritten character string is converted to text (character codes). In chart recognition, the group of strokes corresponding to a handwritten chart (a chart written by hand) is converted to a chart object (digital chart object). In drawing recognition, the group of strokes corresponding to a handwritten drawing (a drawing written by hand) is converted to a drawing object (digital drawing object).

The handwritten note application program 103*b* supports an import/export function. The handwritten note application program 103*b* is configured to output a digital object corresponding to the selected handwritten object to other application programs (this function is referred to as an export function). In a manner similar to the case of "copy as office data", the process for converting the selected handwritten object to a digital object is executed by using character recognition, chart recognition and drawing recognition.

Now, this specification explains a functional configuration of the handwritten note application program 103*b* with reference to FIG. 6.

The handwritten note application program 103*b* includes function execution modules for dealing with handwritten documents, such as a stroke input module 301, a display processor 302, a stroke data generation processor 303, a page storage processor 304, a page acquisition processor 305 and a processor 306.

The handwritten note application program 103*b* prepares, displays and edits a handwritten document by using stroke data input with the touchscreen display 12. The touchscreen display 12 (including the touchpanel 12B and the digitizer 12C) is configured to detect, for example, the generation of events "touch", "move (slide)" and "release". The event "touch" indicates that the stylus 100 or a finger comes into contact with the screen. The event "move (slide)" indicates that the stylus 100 or a finger is moved in a state where the stylus 100 or the finger comes into contact with the screen (in other words, the contact position is moved). The event "release" indicates that the stylus 100 or a finger is moved away from the screen.

The stroke input module 301 receives the event "touch" or "move (slide)" from the touchscreen display 12 and detects a handwritten input operation by the reception. The event "touch" includes the coordinates of the contact position. The event "move (slide)" includes the coordinates of the contact position to which the stylus 100 or the finger is moved. In this manner, the stroke input module 301 is configured to receive a coordinate column corresponding to each stroke input in handwriting from the touchscreen display 12.

The display processor 302 displays a handwritten document including a plurality of strokes on the screen of the LCD 12A. The display processor 302 receives the coordinate column from the stroke input module 301 and displays each stroke input in handwriting on the screen of the LCD 12A based on the received coordinate column.

The stroke data generation processor 303 receives the coordinate column from the stroke input module 301 and generates time-series data having the data structure explained in FIG. 4 based on the received coordinate column. In this case, the time-series data may be temporarily stored in a working memory 401.

The page storage processor 304 stores the time-series data (stroke data) in a storage medium 402. The page storage processor 304 may automatically store the handwritten document which is edited in progress in the storage medium 402 at intervals. When the handwritten note application program 103*b* is suspended or ended, the page storage processor 304 may automatically store the handwritten document which is edited in progress in the storage medium 402.

The page acquisition processor 305 acquires (reads) the handwritten document to be browsed or edited from the storage medium 402. The handwritten document (specifically, each stroke included in the handwritten document) acquired by the page acquisition processor 305 is displayed on the screen of the LCD 12A by the display processor 302.

The processor 306 executes various functions such as character recognition, chart recognition and drawing recognition relative to a handwritten document. Specifically, the processor 306 executes a process for outputting a chart object (digital chart object) corresponding to a handwritten chart in the handwritten document which is currently browsed or edited. The processor 306 generates a chart object from a handwritten chart (in other words, the processor 306 converts a handwritten chart to a chart object) based on the chart recognition result relative to the handwritten chart and the character recognition result relative to the handwritten characters (strings) included in the handwritten chart. A plurality of strokes constituting the handwritten chart include a plurality of vertical ruled lines and a plurality of lateral ruled lines. In the handwritten chart, the vertical ruled lines and the lateral ruled lines form a plurality of areas substantially surrounded by the vertical and lateral ruled lines. In other words, the handwritten chart includes a plurality of areas defined by the group of strokes corresponding to the vertical and lateral ruled lines. The chart object generated from the handwritten chart includes a plurality of cells corresponding to the areas included in the handwritten chart.

Figures 7, 8:
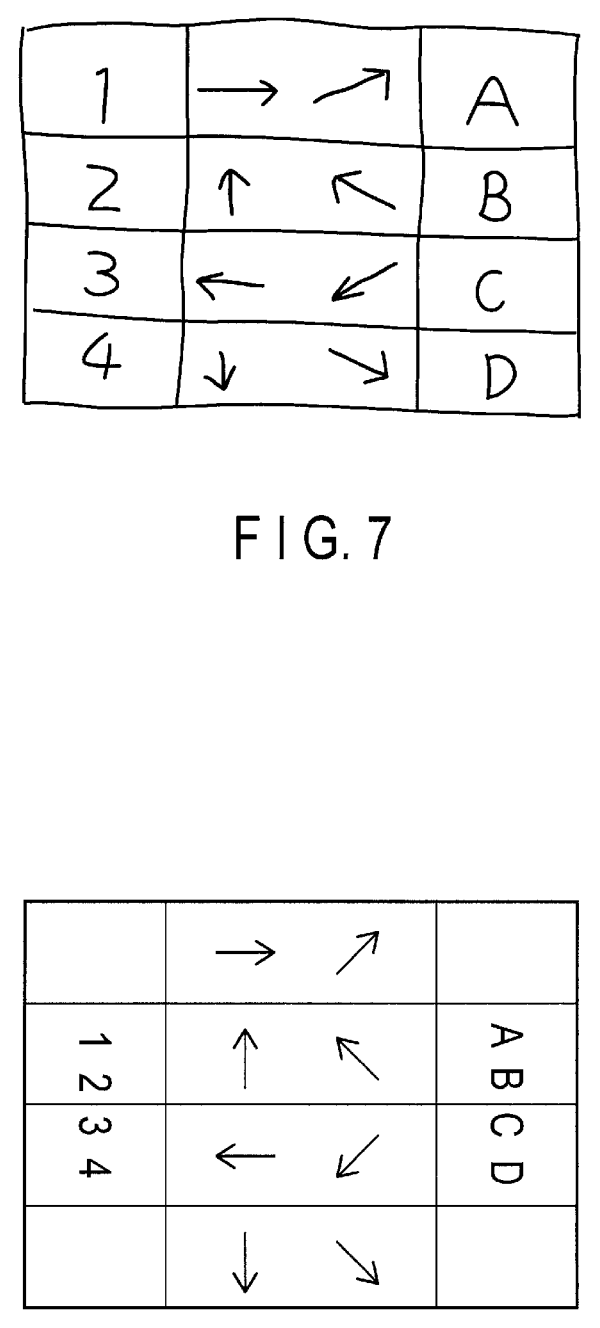

This specification explains a case where the chart object intended by the user is not generated, referring to FIG. 7 and FIG. 8.

FIG. 7 shows a handwritten chart which has four rows and three columns and includes handwritten characters and drawings (arrows) in a plurality of areas defined by the group of strokes corresponding to vertical and lateral ruled lines.

When the chart shown in FIG. 7 is written by hand, for example, the numbers "1" to "4" are consecutively written by hand in the respective areas of the leftmost column of the handwritten chart.

In the handwritten document of the present embodiment, as described above, the order in which strokes were handwritten (in other words, the writing order) is stored as time-series data in the storage medium. When character recognition is applied to the handwritten characters in the handwritten chart shown in FIG. 7, the handwritten consecutive numbers "1" to "4" are dealt with a character string. Thus, the character recognition results in "1234".

In a similar manner, when the characters "A" to "D" are consecutively handwritten in the respective areas of the rightmost column of the handwritten chart, the characters "A" to "D" are dealt with a character string. Thus, the character recognition results in "ABCD".

FIG. 8 shows an example of a chart object generated from the handwritten chart shown in FIG. 7 based on the above character recognition results. With reference to FIG. 7, the user presumably intends the generation of a chart object in which each of the handwritten numbers "1" to "4" (or each of the handwritten characters "A" to "B") is included in the corresponding cell one by one. However, in the chart object shown in FIG. 8, each of the character recognition results "1234" and "ABCD" is dealt with as a character string. Thus, the chart object intended by the user is not generated.

In the present embodiment, a group of strokes which are dealt with as a character string (in other words, a group of strokes which constitute a plurality of characters) as described above is separated based on ruled lines. Based on this separation result, a chart object is generated.

Now, FIG. 6 is referred to again. The processor 306 includes a structuring processor 306a, a chart recognition processor 306b, a separation processor 306c, an inclusion processor 306d, a character recognition processor 306e and a chart object generation processor 306f.

The structuring processor 306a executes a structuring process based on a handwritten document (time-series data). In the structuring process, a plurality of strokes (specifically, stroke data items corresponding to a plurality of strokes) included in the handwritten document are separated into a plurality of character blocks. For example, a group of strokes (in other words, a character string) constituting a plurality of characters consecutively written by hand is included in each character block. In the structuring process, for example, a plurality of character blocks located in vicinity to each other (within a predetermined range) in the handwritten document are grouped based on the position of each of the separated character blocks in the handwritten document.

The chart recognition processor 306b executes a chart recognition process for recognizing a handwritten chart in a handwritten document. In the chart recognition process, a handwritten chart (that is, the group of strokes corresponding to vertical and lateral ruled lines) is orderly formed, and in this manner, the layout (structure) of a chart object is obtained. The layout of the chart object includes, for example, a single cell or a combined cell. A combined cell is a cell prepared by combining a plurality of single cells adjacent to each other.

The separation processor 306c executes a process for separating the character blocks prepared by the structuring processor 306a based on the vertical and lateral ruled lines (specifically, the group of strokes corresponding to the vertical and lateral ruled lines) constituting the handwritten chart in the handwritten document. Each of the separated character blocks includes at least one handwritten character.

The inclusion processor 306d executes a process for determining whether or not the separated character blocks should be included in the cells included in the chart object (specifically, the layout of the chart object). In other words, the inclusion processor 306d determines whether the text corresponding to the separated character blocks should be included in the cells included in the chart object or should be displayed as it is on the chart object.

The character recognition processor 306e executes a character recognition process for recognizing the handwritten characters (specifically, the stroke groups constituting the handwritten characters) included in the separated character blocks. In the character recognition process, the text corresponding to the handwritten characters included in the separated character blocks is obtained.

The chart object generation processor 306f generates a chart object by using the determination result obtained by the inclusion processor 306d and the character recognition result obtained by the character recognition processor 306e.

Now, this specification explains an example of a processing procedure of the tablet computer 10 with reference to the flowchart of FIG. 9. The process shown in FIG. 9 is executed when the CPU 101 executes the handwritten note application program 103b.

The processor 306 obtains a handwritten document including a plurality of strokes input in handwriting (block B1). For example, the handwritten document obtained by the processor 306 may be a handwritten document including a plurality of strokes input by the stroke input module 301 from the touchscreen display 12 or may be a handwritten document read from the storage medium 402. In the handwritten document obtained by the processor 306, a handwritten chart is included. The handwritten chart includes a plurality of areas defined by the group of strokes corresponding to vertical and lateral ruled lines as described above.

The handwritten document (specifically, each stroke included in the handwritten document) obtained by the processor 306 is displayed by the display processor 302 on the screen of the touchscreen display 12.

In the explanation below, the handwritten document obtained by the processor 306 in the processing of block B1 is referred to as the target handwritten document.

The structuring processor 306a executes a structuring process based on the target handwritten document (time-series data) (block B2).

In the structuring process, the structuring processor 306a separates a plurality of strokes included in the target handwritten document into a plurality of character blocks including stroke groups (handwritten character strings) including a plurality of characters consecutively written by hand. The stroke group included in each character block prepared by the structuring process is specified based on, for example, the time from the input of the last coordinates of a stroke to the input of the first coordinates of the subsequent stroke (in short, the time intervals at which strokes are handwritten). The time intervals at which strokes are handwritten can be determined based on the time stamp data explained above.

For example, when the characters "A", "B" and "C" shown in FIG. 3 and FIG. 4 are consecutively written by hand, the time intervals at which stroke data items SD1 to SD5 are input are comparatively short. The structuring processor 306a compares a predetermined time reference value with the time intervals at which stroke data items SD1 to SD5 are input. By this comparison, the structuring processor 306a is capable of categorizing the group of strokes corresponding to stroke data items SD1 to SD5 which are input at intervals shorter than the time reference value (in other words, the character string "ABC" written in series by hand at intervals shorter than the time reference value) into one character block. When the time from the input of stroke data item SD5 of the handwritten character string "C" to the input of stroke data item SD6 of the handwritten arrow is longer than the time reference value, the handwritten arrow is not included in the character block.

When the strokes included in the handwritten document are separated into a plurality of character blocks in the above structuring process, the data indicating the character blocks is added to the handwritten document (time-series data).

In the structuring process, the distance between strokes is determined from the coordinates of the strokes, and a group of strokes having the distance shorter than a predetermined distance reference value may be categorized into one character block. Further, for example, character blocks may be determined by using the result of a character recognition process. Specifically, a group of strokes which are recognized as a correct and meaningful character string by a character recognition process may be categorized into one character block.

For convenience sake, in the present embodiment, a stroke group (a handwritten character string) including a plurality of characters is categorized into one character block. However, in the above structuring process, one handwritten character may be categorized into one character block.

The structuring processor 306a categorizes, of the separated character blocks, a plurality of character blocks which are present in a predetermined distance (range) in the handwritten document into the same group. The data for specifying the character blocks included in the same group is added to the handwritten document (time-series data).

When the user instructs (selects) a function which requires handwritten document recognition, such as the function of "copy as office data" or the export function described above, the chart recognition processor 306b executes a chart recognition process for recognizing a handwritten chart in the handwritten document (block B3).

Now, this specification briefly explains a chart recognition process. The chart recognition processor 306b detects a stroke group corresponding to vertical and lateral ruled lines from the strokes included in a handwritten document. Specifically, the chart recognition processor 306b detects strokes which seem to be straight lines and determines the strokes as ruled lines (hereinafter, referred to as ruled line strokes). In this case, the chart recognition processor 306b may determine strokes containing line segments whose lengths are greater than or equal to a threshold and which have substantially horizontal or vertical inclinations as ruled line strokes.

Subsequently, the chart recognition processor 306b determines that an area in which vertical and lateral ruled line strokes intersect with each other at a certain rate or higher is a handwritten chart.

The chart recognition processor 306b recognizes the structure (the number of rows, the number of columns and the area) of the determined handwritten chart based on how the vertical and lateral ruled line strokes are connected in the handwritten chart.

In the handwritten chart of the handwritten document, the outer ruled lines (in other words, the outer frame) may not be described. In such a case, the chart recognition processor 306b specifies imaginary ruled lines (specifically, the positions of imaginary ruled lines) determined from the end portions of the ruled line strokes. For example, imaginary ruled lines are ruled lines which are substantially equivalent to the outer frame of the chart.

The chart recognition processor 306b obtains (prepares) the layout of the chart object corresponding to the structure of the handwritten chart recognized in the above manner. The layout of the chart object includes the same number of cells (single cells or combined cells) as the number of areas included in the handwritten chart.

Now, this specification explains the detail of the chart recognition process executed by the chart recognition processor 306b.

Figure 10:
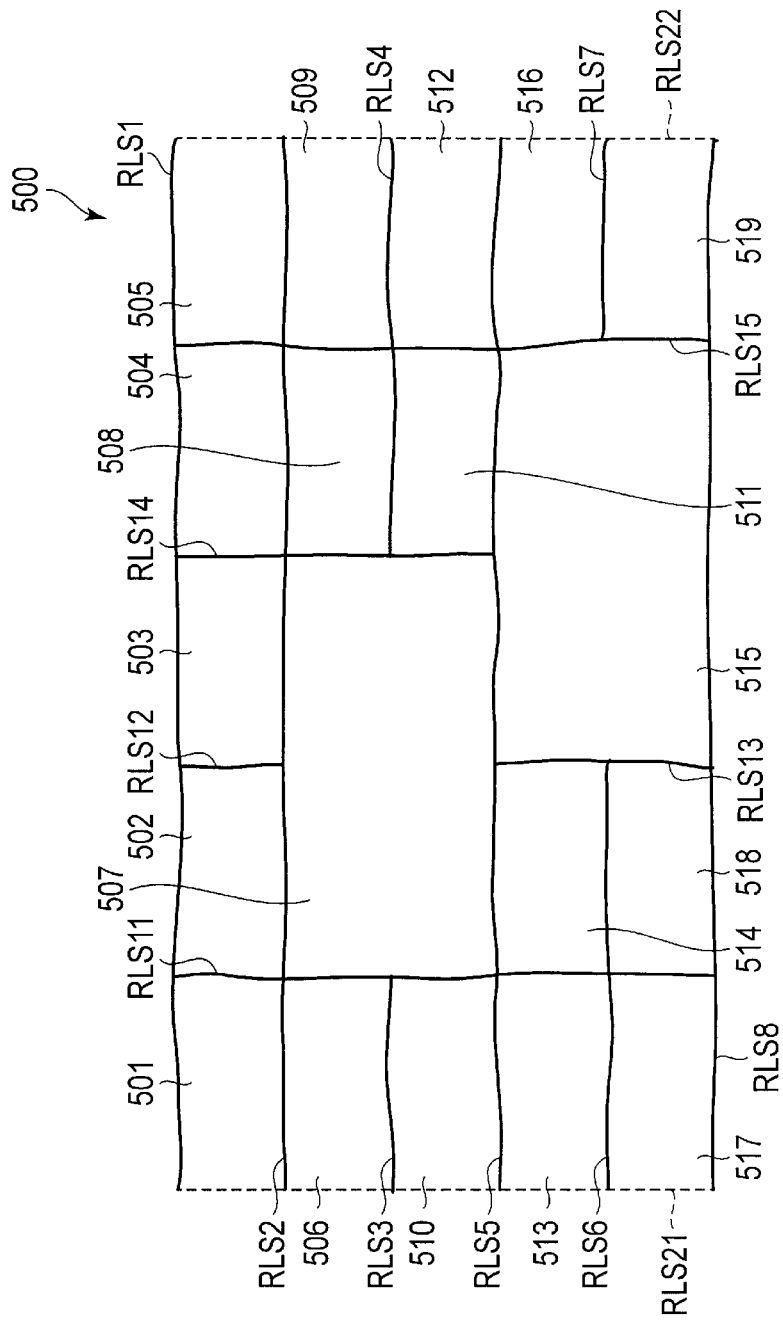
FIG. 10 shows an example of a handwritten chart in a handwritten document.

FIG. 10 shows an example of a handwritten chart in a handwritten document. In FIG. 10, handwritten character strings (specifically, stroke groups constituting handwritten character strings) included in a handwritten chart 500 are omitted.

In the case of the handwritten chart 500 shown in FIG. 10, the chart recognition processor 306b detects ruled line strokes RLS1 to RLS8 as ruled line strokes which horizontally extend (in short, lateral ruled line strokes) from the handwritten document. The chart recognition processor 306b detects ruled line strokes RLS11 to RLS15 as ruled line strokes which perpendicularly extend (in short, vertical ruled line strokes) from the handwritten document.

In the handwritten chart 500 shown in FIG. 10, the ruled lines (strokes) corresponding to the left and right outer lines are not described. In this case, the chart recognition processor 306b is configured to specify imaginary ruled line RLS21 from the left end portions (specifically, the positions of the left end portions) of lateral ruled line strokes RLS1 to RLS8. In a similar manner, the chart recognition processor 306b is configured to specify imaginary ruled line RLS22 from the right end portions (specifically, the positions of the right end portions) of lateral ruled line strokes RLS1 to RLS8.

Subsequently, the chart recognition processor 306b recognizes the structure of the handwritten chart 500 based on lateral ruled line strokes RLS1 to RLS8, vertical ruled line strokes RLS11 to RLS15 and imaginary ruled lines RLS21 and RLS22. In this case, the chart recognition processor 306b recognizes that the handwritten chart 500 is a chart which basically includes five rows, five columns and areas 501 to 519.

The chart recognition processor 306b obtains the layout of the chart object by orderly forming the handwritten chart 500 based on the recognized structure of the handwritten chart 500.

Figure 11:
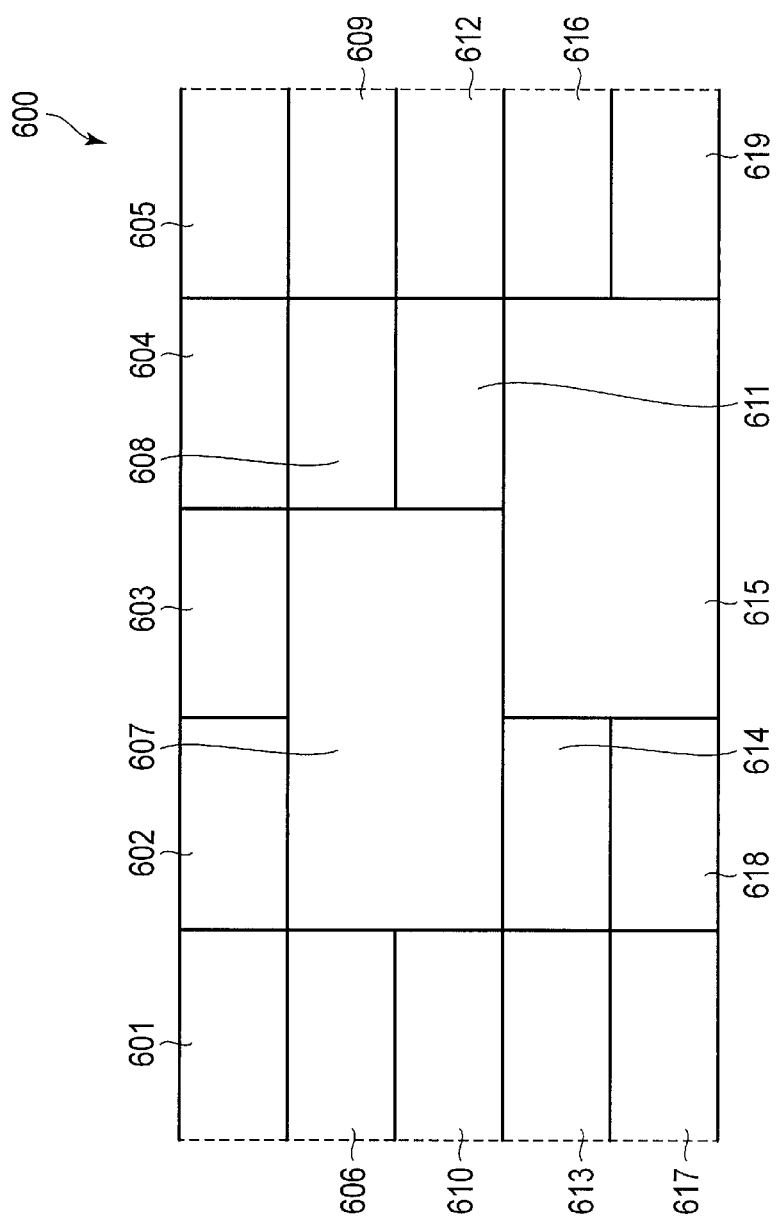
FIG. 11 shows an example of a layout of a chart object obtained from the handwritten chart shown in FIG. 10.

FIG. 11 shows an example of the layout of the chart object obtained from the handwritten chart 500 shown in FIG. 10. As shown in FIG. 11, a layout 600 of the chart object includes cells 601 to 619 corresponding to areas 501 to 519 shown in FIG. 10, respectively. The layout 600 of the chart object includes the same number of cells as the number of areas included in the handwritten chart 500.

Of cells 601 to 619 shown in FIG. 11, cells 607 and 615 are combined cells. The cells other than cells 607 and 615 are single cells.

In FIG. 11, the ruled lines which are equivalent to imaginary ruled lines RLS21 and RLS22 shown in FIG. 10 are indicated by broken lines. The broken lines are shown for, for example, cell 601 for convenience sake. In practice, the ruled lines which are equivalent to imaginary ruled lines RLS21 and RLS22 are not included in the layout 600 of the chart object (in other words, the ruled lines are not displayed as the chart object).

In the chart recognition process, a drawing recognition process is also executed depending on the need. In the drawing recognition process, a handwritten drawing included in the handwritten chart of the handwritten document can be recognized.

Now, FIG. 9 is referred to again. The separation processor 306c applies a separation determination process to each character block (specifically, a handwritten character string included in each character block) prepared by the structuring processor 306a based on the vertical and lateral ruled line strokes (and imaginary ruled lines) constituting the handwritten chart in the handwritten document (block B4). In the separation determination process, the separation processor 306c determines whether or not each character block should be separated. Specifically, the determination result of the separation determination process includes "separation by ruled line", "no separation required" and "separation impossible".

Figure 12:
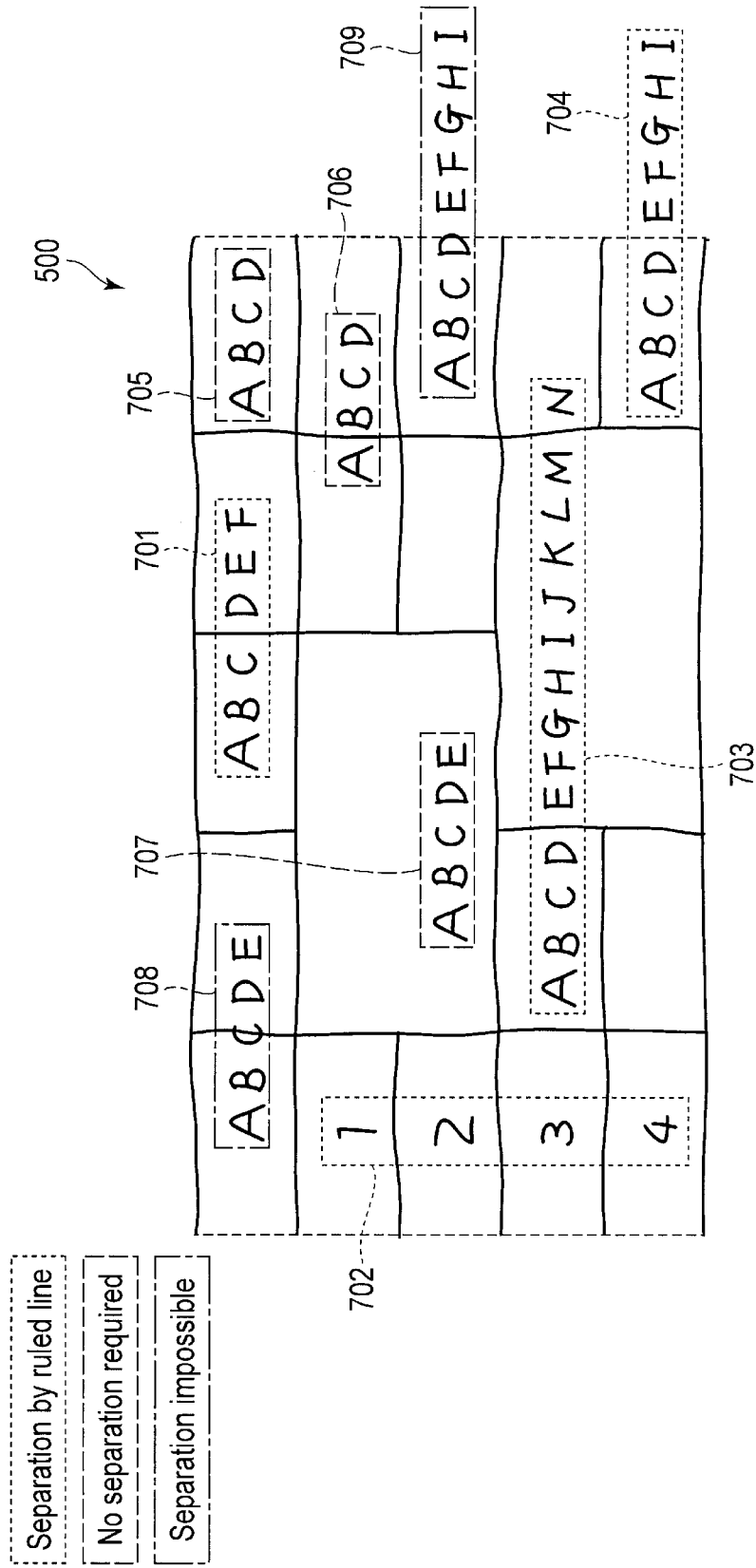
FIG. 12 shows a plurality of character blocks including character strings handwritten in the handwritten chart shown in FIG. 10.
Figure 13:
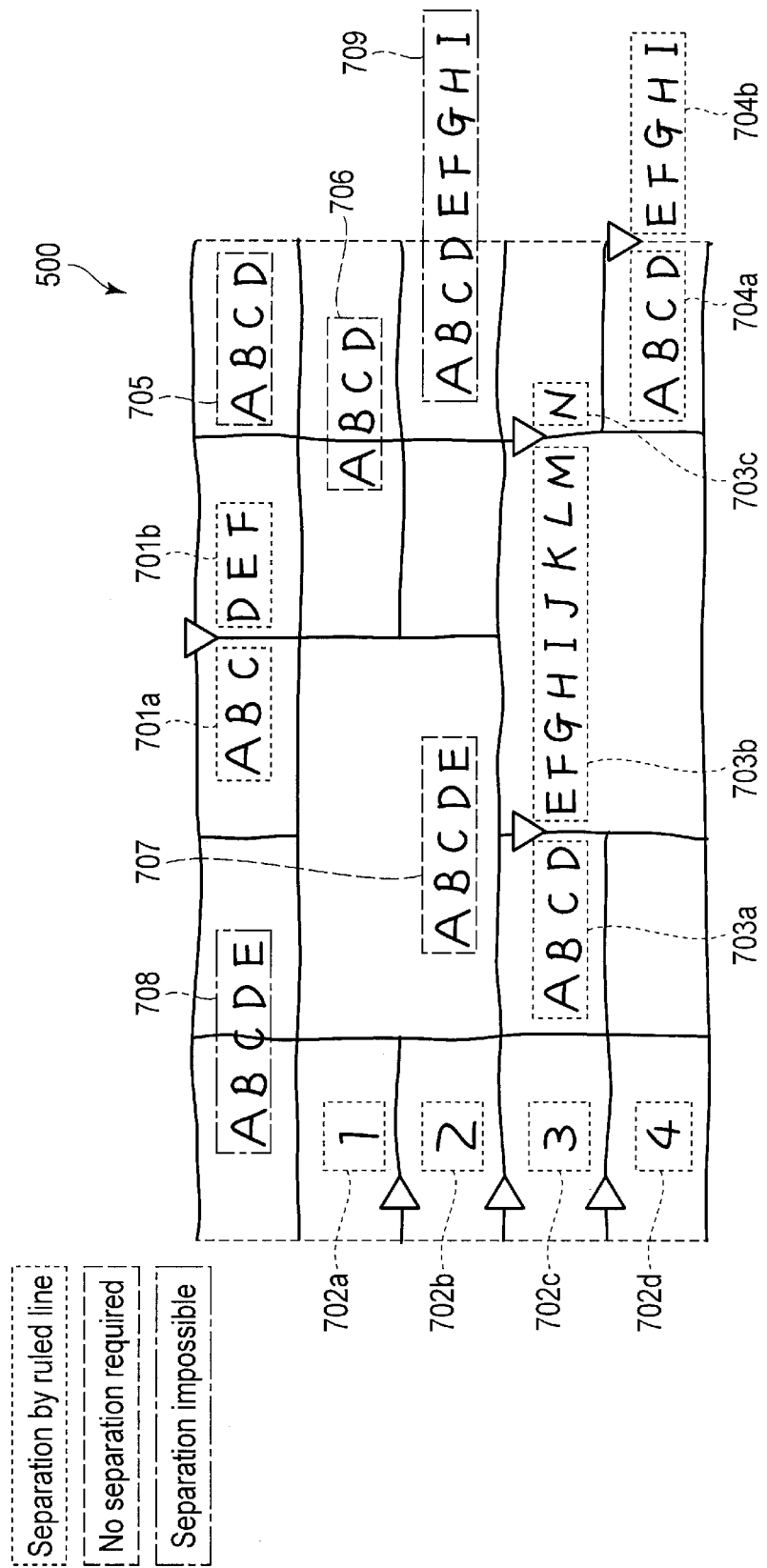
FIG. 13 shows an example of a result of a separation determination process applied to the plurality of character blocks shown in FIG. 12.

Now, this specification explains the detail of the separation determination process with reference to FIG. 12 and FIG. 13. FIG. 12 shows character blocks 701 to 709 including the handwritten character strings included in the handwritten chart 500 shown in FIG. 10. FIG. 13 shows an example of the result of the separation determination process applied to character blocks 701 to 709 shown in FIG. 12. In FIG. 13, the mark "V" indicates the separated position of a character block.

Hereinafter, the reference numbers and symbols shown in FIG. 10 are used to explain the areas and ruled line strokes included in the handwritten chart 500.

First, this specification explains a case of determination as "separation by ruled line" in a separation determination process. When a character block to which a separation determination process is applied is determined as "separation by ruled line", the character block (specifically, the handwritten character string included in the character block) is separated by a ruled line stroke.

In the example shown in FIG. 12, of character blocks 701 to 709, character blocks 701 to 704 are determined as "separation by ruled line".

Specifically, as indicated by character block 701, when the character string "ABCDEF" laterally written by hand ranges (extends) over two areas (503 and 504) included in the handwritten chart 500, and none of the strokes of the stroke group constituting the handwritten character string "ABCDEF" overlaps ruled line stroke RLS14, character block 701 is determined as "separation by ruled line". In this case, as shown in FIG. 13, character block 701 is separated into two character blocks (701a and 701b). Character block 701a includes the strokes of area 503 (in short, the handwritten character string "ABC"). Character block 701b includes the strokes of area 504 (in short, the handwritten character string "DEF".

As indicated by character block 702, when the character string "1234" vertically written by hand ranges over four areas (506, 510, 513 and 517) included in the handwritten chart 500, and none of the strokes of the stroke group constituting the handwritten character string "1234" overlaps ruled line stroke RLS3, RLS5 or RLS6, character block 702 is determined as "separation by ruled line". In this case, as shown in FIG. 13, character block 702 is separated into four character blocks (702a, 702b, 702c and 702d). Character block 702a includes the stroke of area 506 (in short, the handwritten character "1"). Character block 702b includes the stroke of area 510 (in short, the handwritten character "2"). Character block 702c includes the stroke of area 513 (in short, the handwritten character "3"). Character block 702d includes the strokes of area 517 (in short, the handwritten character "4").

As indicated by character block 703, when the handwritten character string "ABCDEFGHIJKLMN" ranges over three areas (514 to 516) included in the handwritten chart 500, and none of the strokes of the stroke group constituting the handwritten character string "ABCDEFGHIJKLMN" overlaps ruled line stroke RLS13 or RLS15, character block 703 is determined as "separation by ruled line". In this case, as shown in FIG. 13, character block 703 is separated into three character blocks (703a, 703b and 703c). Character block 703a includes the strokes of area 514 (in short, the handwritten character string "ABCD"). Character block 703b includes the strokes of area 515 (in short, the handwritten character string "EFGHIJKLM"). Character block 703c includes the stroke of area 516 (in short, the handwritten character "N"). Area 515 is an area corresponding to combined cell 615 included in the chart object 600 (specifically, the layout of the chart object 600) shown in FIG. 11. Thus, even when a character block ranges over a plurality of areas including an area corresponding to a combined cell, the character block is separated.

As indicated by character block 704, when the handwritten character string "ABCDEFGHI" ranges over area 519 included in the handwritten chart 500 and an area outside the handwritten chart 500 (that is, an external area), and none of the strokes of the stroke group constituting the handwritten character string "ABCDEFGHI" overlaps imaginary ruled line RLS22, character block 704 is determined as "separation by ruled line". In this case, as shown in FIG. 13, character block 704 is separated into two character blocks (704a and 704b). Character block 704a includes the strokes of area 519 (in short, the handwritten character string "ABCD"). Character block 704b includes the strokes of the area outside the handwritten chart 500 (in short, the handwritten character string "EFGHI"). Thus, a character block is separated by an imaginary ruled line as well as vertical and lateral ruled lines written by hand (ruled line strokes).

In the present embodiment, a character block which can be separated by a handwritten ruled line or an imaginary ruled line is determined as "separation by ruled line".

Now, this specification explains a case of determination as "no separation required" in a separation determination process. When a character block to which a separation determination process is applied is determined as "no separation required", there is no need to separate the character block. Thus, the character block (specifically, the handwritten character string included in the character block) is not separated.

In the example shown in FIG. 12, of character blocks 701 to 709, character blocks 705 to 707 are character blocks determined as "no separation required".

Specifically, as indicated by character block 705, when the handwritten character string "ABCD" is (in other words, all of the strokes constituting the handwritten character string "ABCD" are) included in one area (505) included in the handwritten chart 500, character block 705 is determined as "no separation required". In this case, as shown in FIG. 13, character block 705 is not separated.

In a manner similar to character block 701 explained above, the handwritten character string "ABCD" included in character block 706 ranges over two areas (508 and 509) included in the handwritten chart 500, and none of the strokes of the stroke group constituting the handwritten character string "ABCD" overlaps ruled line RLS15. However, as indicated by character block 706, when the handwritten character string "ABCD" (specifically, the group of strokes constituting the handwritten character string "ABCD") is started from a position at least in the latter half part of area 508, character block 706 is determined as "no separation required". When a handwritten character string is started from a position in the latter half part of an area (specifically, the latter half part of the cell corresponding to an area) included in the handwritten chart 500, the user presumably wrote the character string as a series of characters. Thus, the user presumably does not intend the character string to be separated. For this reason, as shown in FIG. 13, character block 706 is not separated.

As indicated by character block 707, the handwritten character string "ABODE" is (in other words, all of the strokes constituting the handwritten character string "ABODE" are) included in one area (507) included in the handwritten chart 500, character block 707 is determined as "no separation required". In this case, as shown in FIG. 13, character block 707 is not separated. Area 507 is an area corresponding to combined cell 607 included in the chart object 600 (specifically, the layout of the chart object 600) shown in FIG. 11. Thus, even when a character block is included in the area corresponding to a combined cell, the character block is not separated.

In the present embodiment, a character block included in one area (specifically, the single cell or combined cell corresponding to one area) included in a handwritten chart is determined as "no separation required". A character block which is started from a position in the latter half part of an area included in a handwritten chart and ranges over a plurality of areas is presumed as a character block which is intentionally written so as to range over a plurality of areas. Thus, this character block is determined as "no separation required".

Now, this specification explains a case of determination as "separation impossible" in a separation determination process. When a character block to which a separation determination process is applied is determined as "separation impossible", the character block cannot be separated. Thus, the character block (specifically, the handwritten character string included in the character block) is not separated.

In the example shown in FIG. 12, of character blocks 701 to 709, character blocks 708 and 709 are character blocks determined as "separation impossible".

Specifically, as indicated by character block 708, when the handwritten character string "ABODE" ranges over two areas (501 and 502) included in the handwritten chart 500, and at least one stroke (here, the stroke constituting the handwritten character "C") of the strokes constituting the handwritten character string "ABODE" overlaps ruled line stroke RLS11, character block 708 is determined as "separation impossible". In this case, as shown in FIG. 13, character block 708 is not separated.

As indicated by character block 709, when the handwritten character string "ABCDEFGHI" ranges over area 512 included in the handwritten chart 500 and an area outside the handwritten chart 500 (an external area), and at least one stroke (here, the strokes constituting the handwritten character "D") of the strokes constituting the handwritten character string "ABCDEFGHI" overlaps imaginary ruled line RLS22, character block 709 is determined as "separation impossible". In this case, as shown in FIG. 13, character block 709 is not separated.

In the present embodiment, when a character block includes a handwritten character string including a stroke intersecting with (overlapping) a handwritten ruled line or an imaginary ruled line, the character block is determined as "separation impossible".

As explained above, in a separation determination process, it is possible to separate a character block which is determined as "separation by ruled line" based on vertical and lateral ruled line strokes (and imaginary strokes) constituting a handwritten chart. On the other hand, a character block which is determined as "no separation required" or "separation impossible" is not separated.

The criteria (conditions) for determining each character block as "separation by ruled line", "no separation required" or "separation impossible" are retained in the processor 306 in advance. The separation determination process explained above is merely an example. The separation determination process may be executed based on criteria other than the criteria explained above.

In the following steps, each of the character blocks prepared through the separation by the separation determination process (for example, character blocks 701a, 701b, 702a to 702d, 703a, 703b, 704a and 704b shown in FIG. 13) and the character blocks which are not separated by the separation determination process (for example, character blocks 705 to 709 shown in FIG. 13) is dealt with as one character block.

Now, FIG. 9 is referred to again. The inclusion processor 306d applies an inclusion determination process to each of the character blocks obtained by the separation determination process (block B5). The inclusion determination process is executed to determine whether or not each character block should be included in a cell included in a chart object (specifically, the layout of a chart object).

The inclusion determination process is explained in detail. First, this specification explains an example of a character block determined as a character block which should be included in a cell included in a chart object with reference to FIG. 14.

Figure 14:
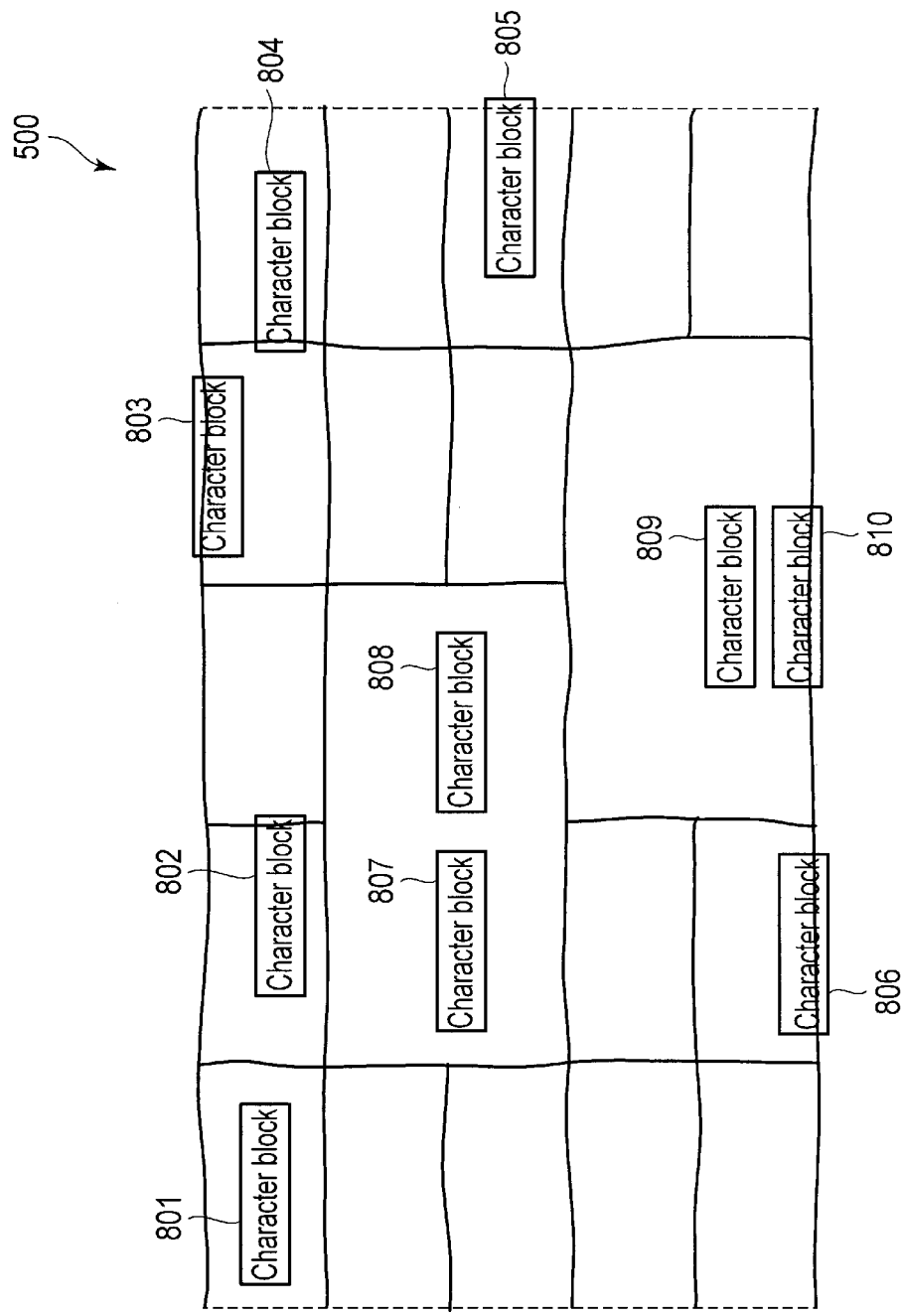
FIG. 14 is shown for explaining an example of a character block defined as a character block which should be included in a cell included in a chart object.

FIG. 14 shows a plurality of character blocks (801 to 810) including character strings handwritten in the handwritten chart 500 shown in FIG. 10. Character blocks 801 to 810 are character blocks obtained by the aforementioned separation determination process.

In FIG. 14, character blocks 801 to 810 are allocated in the handwritten chart 500 shown in FIG. 10 to easily explain the inclusion determination process. Character blocks 801 to 810 are different from the character blocks shown in FIG. 12 and FIG. 13. A handwritten character string is included in each of character blocks 801 to 810. However, the handwritten character string is omitted in FIG. 14.

This specification explains a plurality of areas which are included in the handwritten chart 500 and cells which are included in a chart object (specifically, the layout of a chart object) and correspond to the plurality of areas, by using the reference numbers shown in FIG. 10 and FIG. 11.

As indicated by character block 801, when the character block is included in one area (501) included in the handwritten chart 500, character block 801 is determined as a character block which should be included in the cell (601) corresponding to area 501.

Now, this specification assumes a case where a character block ranges over two areas (502 and 503) included in the handwritten chart 500 as indicated by character block 802. When the right part of character block 802 (specifically, the right part of the stroke group including the handwritten character string included in character block 802) in area 503 is less than a threshold; in other words, when the right part of character block 802 in area 503 is within a predetermined range (allowable range), character block 802 is determined as a character block which should be included in cell 602 corresponding to area 502.

Now, this specification assumes a case where a character block ranges over one area (504) included in the handwritten chart 500 and an area outside the handwritten chart 500 as indicated by character block 803. When the upper part of character block 803 in the area outside the handwritten chart 500 is within an allowable range, character block 803 is determined as a character block which should be included in cell 604 corresponding to area 504. The similar determination result is obtained when a character block ranges over two areas (two areas which are vertically adjacent to each other) included in the handwritten chart 500.

Now, this specification assumes a case where a character block ranges over two areas (504 and 505) included in the handwritten chart 500 as indicated by character block 804. When the left part of character block 804 in area 504 is within an allowable range, character block 804 is determined as a character block which should be included in cell 605 corresponding to area 505.

Now, this specification assumes a case where a character block ranges over one area (512) included in the handwritten chart 500 and an area outside the handwritten chart 500 as indicated by character block 805. When the right part of character block 805 in the area outside the handwritten chart 500 is within an allowable range, character block 805 is determined as a character block which should be included in cell 612 corresponding to area 512. The border between area 512 and the area outside the handwritten chart 500 is determined by imaginary ruled line RLS22 explained above.

Now, this specification assumes a case where a character block ranges over one area (518) included in the handwritten chart 500 and an area outside the handwritten chart 500 as indicated by character block 806. When the lower part of character block 806 in the area outside the handwritten chart 500 is within an allowable range, character block 806 is determined as a character block which should be included in cell 618 corresponding to area 518. The similar determination result is obtained when a character block ranges over two areas (two areas which are vertically adjacent to each other) included in the handwritten chart 500.

In the inclusion determination process, a plurality of character blocks in the same group present in the same area (specifically, the cell corresponding to the same area) are dealt with as one character block (hereinafter, referred to as a character block group) including the plurality of character blocks.

Specifically, when character blocks 807 and 808 shown in FIG. 14 are character blocks in the same group, the character block group including character blocks 807 and 808 is included in one area (507). In this case, character blocks 807 and 808 are determined as character blocks which should be included in cell 607 corresponding to area 507. Thus, the character block group including character blocks 807 and 808 is processed in a manner similar to character block 801 explained above.

Now, this specification assumes a case where character blocks 809 and 810 shown in FIG. 14 are character blocks in the same group, and the character block group including character blocks 809 and 810 ranges over one area (515) included in the handwritten chart 500 and an area outside the handwritten chart 500. When the lower part of the character block group (here, character block 810) in the area outside the handwritten chart 500 is within an allowable range, character blocks 809 and 810 are determined as character blocks which should be included in cell 615 corresponding to area 515. Thus, the character block group including character blocks 809 and 810 is processed in a manner similar to character block 806 explained above.

In the above description, this specification explains the character block groups which are processed in a manner similar to character blocks 801 and 806. However, character block groups may be processed in a manner similar to character blocks other than character blocks 801 and 806.

Now, this specification explains an example of a character block determined as a character block which should not be included in a cell included in the chart object, referring to FIG. 15.

FIG. 15 shows a plurality of character blocks (901 to 909) including character strings handwritten in the handwritten chart 500 shown in FIG. 10. Character blocks 901 to 909 are character blocks obtained by the aforementioned separation determination process.

In FIG. 15, character blocks 901 to 909 are allocated in the handwritten chart 500 shown in FIG. 10 to easily explain the inclusion determination process. Character blocks 901 to 909 are different from the character blocks shown in FIG. 12 and FIG. 13. A handwritten character string is included in each of character blocks 901 to 909. However, the handwritten character string is omitted in FIG. 15.

This specification explains a plurality of areas which are included in the handwritten chart 500 and the cells which are included in a chart object (specifically, the layout of a chart object) and correspond to the plurality of areas, by using the reference numbers shown in FIG. 10 and FIG. 11.

Now, this specification assumes a case where a character block ranges over one area (501) included in the handwritten chart 500 and an area outside the handwritten chart 500 as indicated by character block 901. When the left part of character block 901 in the area outside the handwritten chart 500 is not within an allowable range, character block 901 is determined as a character block which should not be included in cell 601 corresponding to area 501. The border between area 501 and the area outside the handwritten chart 500 is determined by imaginary ruled line RLS21 explained above. The similar determination result is obtained when a character block ranges over two areas (two areas which are laterally adjacent to each other) included in the handwritten chart 500.

Now, this specification assumes a case where a character block ranges over one area (503) included in the handwritten chart 500 and an area outside the handwritten chart 500 as indicated by character block 902. When the upper part of character block 902 in the area outside the handwritten chart 500 is not within an allowable range, character block 902 is determined as a character block which should not be included in cell 603 corresponding to area 503. The similar determination result is obtained when a character block ranges over two areas (two areas which are vertically adjacent to each other) included in the handwritten chart 500.

Now, this specification assumes a case where a character block ranges over two areas (504 and 505) included in the handwritten chart 500 as indicated by character block 903. When the right part of character block 903 in area 505 is not within an allowable range, character block 903 is determined as a character block which should not be included in cell 604 corresponding to area 504.

Now, this specification assumes a case where a character block ranges over one area (519) included in the handwritten chart 500 and an area outside the handwritten chart 500 as indicated by character block 904. When the lower part of character block 904 in the area outside the handwritten chart 500 is not within an allowable range, character block 904 is determined as a character block which should not be included in cell 619 corresponding to area 519. The similar determination result is obtained when a character block ranges over two areas (two areas which are vertically adjacent to each other) included in the handwritten chart 500.

Character block 905 is included one area (502) included in the handwritten chart 500. However, as shown in FIG. 15, when drawing 911 is (specifically, the strokes indicating drawing 911 are) present in area 502 (specifically, cell 602 corresponding to area 502), character block 905 is determined as a character block which should not be included in cell 602.

As stated above, in the inclusion determination process, a plurality of character blocks in the same group present in (the cell corresponding to) the same area are dealt with as one character block (character block group) including the plurality of character blocks.

For example, when character blocks 906 and 907 shown in FIG. 15 are character blocks in the same group, the character block group including character blocks 906 and 907 is included in one area (507). However, drawing 912 is present in area 507 (specifically, cell 607 corresponding to area 507). In this case, character blocks 906 and 907 are determined as character blocks which should not be included in cell 607.

Character blocks 908 and 909 are included one area (515) included in the handwritten chart 500. However, in the case where character blocks 908 and 909 do not belong to the same group (in other words, character blocks which belong to different groups are present in one area), character blocks 908 and 909 are determined as character blocks which should not be included in cell 615 corresponding to area 515.

When a character block is present outside the handwritten chart 500, the character block is determined as a character block which should not be included in a cell included in the chart object.

As explained above, the inclusion determination process is performed to determine whether or not each of the character blocks obtained by the separation determination process should be included in a cell included in the chart object.

When an inclusion determination process is applied to the result of the separation determination process shown in FIG. 13, character blocks 701a, 701b, 702a to 702d, 703a to 703c, 704a, 705 and 707 are determined as character blocks which should be included in the cells included in the chart object. Character blocks 706, 708 and 709 are determined as character blocks which should not be included in the cells included in the chart object.

In the present embodiment, a character block (specifically, the handwritten character string included in a character block) which mainly satisfies all of the first to third criteria (conditions) described below is determined as a character block which should be included in a cell.

As the first criterion, the character block must not extend from an area (specifically, the cell corresponding to an area) included in the handwritten chart beyond an allowable range. As the second criterion, a drawing must not be present in the area in which the character block is present. As the third criterion, a character block which belongs to a different group must not be present in the same area. When another character block which belongs to the same group is present in the same area, these character blocks which belong to the same group are dealt with as one character block.

The first to third criteria in the inclusion determination process are retained in the processor 306 in advance. The inclusion determination process explained above is merely an example. The inclusion determination process may be performed based on other criteria.

FIG. 9 is referred to again. The character recognition processor 306e executes a character recognition process for recognizing the handwritten character string included in each of the character blocks obtained by the separation determination process (block B6). As the character recognition result of the handwritten character string included in each character block, the character recognition processor 306e obtains the text corresponding to the handwritten character string. Hereinafter, the character recognition result of the handwritten character string included in each character block is referred to as the text of the character block for convenience sake.

Subsequently, the chart object generation processor 306f generates a chart object corresponding to the handwritten chart in the target handwritten document based on the layout of the chart object obtained by the chart recognition processor 306b, the determination result obtained by the inclusion processor 306d and the character recognition result obtained by the character recognition processor 306e (that is, the text of each character block) (block B7).

In this case, the chart object generation processor 306f generates a chart object in which the text (character string) of a character block determined as a character block to be included in a cell in the inclusion determination process is included in (or allocated for) the cell included in the layout of the chart object obtained by the chart recognition processor 306b. The text of each character block is included so as to be positioned in, for example, the center of the cell in the chart object. In other words, a centering process is applied to the text of each character block in the cell.

For example, the chart object generated by the chart object generation processor 306f is copied to the clipboard and output to another application program such as a presentation application program. The chart object can be edited in the application program to which the chart object is output. Specifically, the width or height of each cell included in the chart object can be changed. Moreover, the text included in each cell can be changed.

For example, in the presentation application, a text box (specifically, the object of a text box) can be allocated for an arbitrary position in a file used in the presentation application. The text box is an object which is allowed to specify an arbitrary character string inside the text box.

The chart object generation processor 306f adds, to the chart object, a text box in which the text of a character block determined as a character block which should not be included in a cell in the inclusion determination process is specified. Thus, the text box added to the chart object can be edited as an object different from the chart object in the application program to which the chart object is output. Specifically, the text included in the text box can be changed. Moreover, the position (layout) of the text box can be changed.

Figure 16:
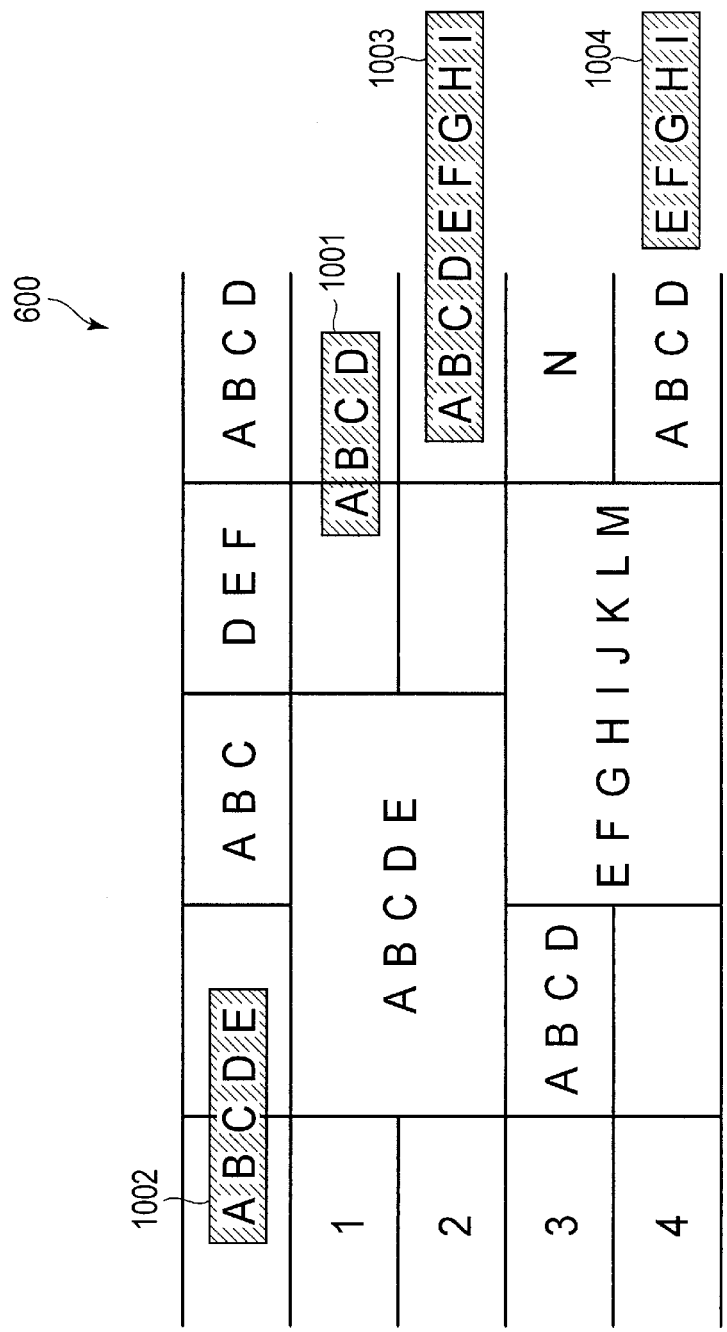
FIG. 16 shows an example of a chart object generated from the handwritten chart including the handwritten character strings shown in FIG. 12.

FIG. 16 shows an example of a chart object generated from the handwritten chart 500 of FIG. 12 in which character strings are handwritten. The result of the separation determination process regarding character blocks 701 to 709 shown in FIG. 12 is shown in FIG. 13. Character blocks 701a, 701b, 702a to 702d, 703a to 703c, 704a, 705 and 707 shown in FIG. 13 are determined as character blocks which should be included in the cells included in the chart object in the inclusion determination process. Character blocks

706, 708 and 709 shown in FIG. 13 are determined as character blocks which should not be included in the cells included in the chart object in the inclusion determination process.

In this case, as shown in FIG. 16, the text of each of character blocks 701*a*, 701*b*, 702*a* to 702*d*, 703*a* to 703*c*, 704*a*, 705 and 707 shown in FIG. 13 is included in a corresponding cell in the chart object 600 (specifically, the layout of the chart object 600). The text is included so as to be positioned in the center of each cell.

The text of each of character blocks 706, 708 and 709 is not included in the chart object 600. Instead, the text boxes (1001 to 1004) including the text of character blocks 706, 708 and 709 are added to the chart object 600. Text boxes 1001 to 1004 are allocated on the chart object 600 based on the positions in which the character strings corresponding to the text included in the text boxes are handwritten in the handwritten chart 500 shown in FIG. 12.

In the example shown in FIG. 16, the text of character block 703*b* shown in FIG. 13 is included so as to be positioned in the center of cell 615 shown in FIG. 11. However, the text of character block 703*b* may be included so as to be positioned in the upper part of cell 615 and be displayed in a position equivalent to character block 703*b* (specifically, the handwritten character string "EFGHI-JKLM" included in character block 703*b*) shown in FIG. 13.

FIG. 16 shows text box 1004. However, a text box may not be added to the text of a character block determined as a character block which should be positioned outside the handwritten chart 500 in the separation determination process.

As explained above, the present embodiment determines whether or not each of the character blocks obtained by the separation determination process should be included in a cell included in the chart object. When a character block is determined as a character block which should be included in a cell, the text of the character block is included in the chart object (specifically, the layout of the chart object). When a character block is determined as a character block which should not be included in a cell, the text box including the text of the character block is added to the chart object.

Specifically, in the present embodiment, when a first stroke group (handwritten character string) including a plurality of characters ranges over first and second areas included in a handwritten chart, and the first stroke group does not substantially overlap a ruled line, a second character recognition result regarding a second stroke of the first stroke group in the first area is included in a first cell corresponding to the first area, and a third character recognition result regarding a third stroke of the first stroke group in the second area is included in a second cell corresponding to the second area. When the first stroke group ranges over the first and second areas, and the first stroke group substantially overlaps a ruled line, an object of a text box including a first character recognition result regarding the first stroke group is added to a chart object.

In the present embodiment, whether or not the first stroke group substantially overlaps a ruled line is not determined based on whether or not the first stroke group is written by the user accidently on the ruled line. Whether or not the first stroke group substantially overlaps a ruled line is determined based on whether or not the first stroke group is written by the user intentionally over a plurality of areas (cells). For example, when the number of intersections between the first stroke group and a ruled line is greater than or equal to N (N is an integer which is greater than or equal to one), the first stroke group is determined as substantially overlapping the ruled line. Whether or not the first stroke group substantially overlaps a ruled line may be determined by using the sum of the amounts extending from the area (cell) in which the strokes of the first stroke group are mainly positioned to another area (cell).

In the present embodiment, when the first stroke group ranges over the first and second areas, and at least one stroke of the first stroke group overlaps a ruled line, and the part of the first stroke group in the second area is less than a threshold (in other words, within an allowable range), the first character recognition result is included in the first cell. When the first stroke group ranges over the first and second areas, and at least one stroke of the first stroke group overlaps a ruled line, and the part of the first stroke group in the first area is less than a threshold (in other words, within an allowable range), the first character recognition result is included in the second cell.

In the present embodiment, the condition that the part of the first stroke group in another area (for example, the second area) is less than a threshold means that the amount extending from the area (cell) in which the first stroke group is mainly positioned to another area (cell) is small. For example, when the distance of strokes which extend from the main positional area (cell) to the other area (cell) is within the threshold from the border of the areas, the part of the first stroke group in the other area is determined as smaller than the threshold. When the sum of the amounts extending from the area (cell) in which the strokes of the first stroke group are mainly positioned to the other area (cell) is within the threshold, the part of the first stroke group in the other area may be determined as smaller than the threshold.

In the present embodiment, when the first stroke group ranges over a third area which is substantially surrounded for its formation by an imaginary ruled line and a handwritten ruled line and a fourth area which is outside the handwritten chart, and none of the strokes of the first stroke group does not overlap the imaginary ruled line, a fourth character recognition result regarding a fourth stroke in the third area is included in a third cell corresponding to the third area. When the first stroke group ranges over the third and fourth areas, and at least one stroke of the first stroke group overlap the imaginary ruled line, the object of a text box including the first character recognition result is added to the chart object.

In the present embodiment, when the first stroke group ranges over the first and second areas, and none of the strokes of the first stroke group overlaps a ruled line, and a stroke indicating a drawing is present in the first area, the object of a text box including the second character recognition result is added to the chart object. In a similar manner, when the first stroke ranges over the first and second areas, and none of the strokes of the first stroke group overlaps a ruled line, and a stroke indicating a drawing is present in the second area, the object of a text box including the third character recognition result is added to the chart object.

In the present embodiment, when the first stroke group ranges over the first and second areas, and none of the strokes of the first stroke group overlaps a ruled line, and the first stroke group is started from a position at least in the latter half part of the first or second area, the object of a text box including the first character recognition result is added to the chart object.

In the present embodiment, when the first stroke group ranges over the first and second areas, and none of the strokes of the first stroke group overlaps a ruled line, and a fifth stroke which is different from the second stroke is present in vicinity to the second stroke in the first area, the second character recognition result and a fifth character recognition result regarding the fifth stroke are included in the first cell. When the first stroke group ranges over the first and second areas, and none of the strokes of the first stroke group overlaps a ruled line, and the fifth stroke is present in a position other than the vicinity of the second stroke in the first area, the object of a text box including each of the second character recognition result and the fifth character recognition result is added to the chart object.

In the present embodiment, the intension of the user who handwrote a chart is presumed in order to separate the stroke group (handwritten character string) including a plurality of characters. By this process, when a chart object is generated from the handwritten chart, the character string (character recognition result) corresponding to the strokes in each area included in the handwritten chart can be appropriately allocated for each cell included in the chart object. Thus, it is possible to generate (output) a chart object corresponding to the handwritten chart in line with the user's intention. In other words, in the present embodiment, as explained in FIG. 7 and FIG. 8, it is possible to prevent the situation in which the chart object intended by the user is not generated, and improve the layout accuracy of character strings when orderly forming the handwritten chart.

In the present embodiment, the character recognition result (text) relative to a stroke group (handwritten character string) which should not be included in a cell included in a chart object is added to the chart object as a text box. Thus, it is possible to generate a chart object corresponding to the chart handwritten by the user with high accuracy.

The tablet computer 10 of the present embodiment may be configured to operate in different operation modes.

Now, this specification assumes that the tablet computer 10 operates in first to third operation modes.

The tablet computer 10 operates in the first operation mode to execute the process explained in the present embodiment (that is, the process shown in FIG. 9). When the tablet computer 10 operates in the first operation mode, it is possible to generate a chart object in which, of the character blocks obtained by the separation determination process, the text of character blocks determined as character blocks which should be included in cells is included in the cells. A text box including the text of each character block determined as a character block which should not to be included in a cell is added to the chart object.

The tablet computer 10 operates in the second operation mode to generate a chart object in which all of the text items corresponding to the handwritten character strings in the handwritten chart are included in cells. When the tablet computer 10 operates in the second operation mode, it is possible to generate a chart object in which the text of each of character blocks obtained by separation in a structuring process is included in a cell included in the chart object (specifically, the layout of the object) obtained by a chart recognition process. As explained above, the text of a character block which ranges over a plurality of areas included in the handwritten chart may be included in, for example, the cell corresponding to the area having the greatest proportion in occupation of the character block (specifically, the handwritten character string included in the character block).

The tablet computer 10 operates in the third operation mode to generate a chart object in which all of the text items corresponding to the handwritten character strings in the handwritten chart are added as text boxes. When the tablet computer 10 operates in the third operation mode, it is possible to generate a chart object in which the text box including the text of each of character blocks obtained by separation in a structuring process is added. The text box is allocated on the chart object (specifically, the layout of the chart object) based on the position in which the character string corresponding to the text included in the text box is written in the handwritten chart.

It is possible to generate (output) a chart object in line with the user's intension by allowing the mode of the tablet computer 10 to be selected from the first to third modes in accordance with, for example, the instruction (operation) by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising circuitry configured to:

display a handwritten chart including handwritten strokes on a screen, the strokes including three or more vertical ruled lines and two or more lateral ruled lines, the vertical and lateral ruled lines forming at least a first area and a second area surrounded by the vertical and lateral ruled lines; and execute a process for outputting a chart object corresponding to the handwritten chart, the chart object including a first cell corresponding to the first area and a second cell corresponding to the second area, wherein when a first stroke group including characters extends over the first area and the second area, and the first stroke group substantially overlaps the vertical ruled line, a first text box including a first character recognition result regarding the first stroke group is added to the first cell and the second cell, when the first stroke group extends over the first area and the second area, and at least one stroke of the first stroke group overlaps the vertical ruled line or the lateral ruled line, and a part of the first stroke group in the second area is less than a threshold, the first character recognition result is included in the first cell, when the first stroke group extends over the first and second areas, and the first stroke group does not substantially overlap any of the vertical ruled lines, a second character recognition result regarding a second stroke of the first stroke group in the first area is included in the first cell, and a third character recognition result regarding a third stroke of the first stroke group in the second area is included in the second cell, and when the first stroke group extends over the first and second areas, and none of the strokes of the first stroke group overlaps the vertical ruled line, and a stroke indicative of a drawing is present in the first area, a second text box including the second character recognition result is added to the first cell and the second cell.

2. The electronic apparatus of claim 1, wherein
when the first stroke group extends over a third area which is substantially surrounded by an imaginary ruled line determined by end portions of the vertical or lateral ruled lines and other ruled lines and a fourth area which is outside the handwritten chart, and none of the strokes of the first stroke group overlaps the imaginary ruled line, a fourth character recognition result regarding a fourth stroke in the third area is included in a third cell corresponding to the third area, and when the first stroke group extends over the third and fourth areas, and at least one stroke of the first stroke group overlaps the imaginary ruled line, a third text box including the first character recognition result is added to the third cell.

3. The electronic apparatus of claim 1, wherein when the first stroke group extends over the first and second areas, and none of the strokes of the first stroke group overlaps any of the vertical ruled lines, and the first stroke group is started from a position at least in a latter half part of the first or second area, a fourth text box including the first character recognition result is added to the first cell and the second cell.

4. The electronic apparatus of claim 1, wherein when the first stroke group extends over the first and second areas, and none of the strokes of the first stroke group overlaps any of the vertical ruled lines, and a fifth stroke which is different from the second stroke is present in a first range of the second stroke in the first area, the second character recognition result and a fifth character recognition result regarding the fifth stroke are included in the first cell, and when the first stroke group extends over the first and second areas, and none of the strokes of the first stroke group overlaps any of the vertical ruled lines, and the fifth stroke is present outside the first range of the second stroke in the first area, a fifth text box including each of the second character recognition result and the fifth character recognition result is added to the first cell and the second cell.

5. A method performed by an electronic apparatus, comprising:

displaying a handwritten document including handwritten strokes on a screen, the strokes including three or more vertical ruled lines and two or more lateral ruled lines, the vertical and lateral ruled lines forming at least a first area and a second area surrounded by the vertical and lateral ruled lines; and executing a process for outputting a chart object corresponding to the handwritten chart, the chart object including a first cell corresponding to the first area and a second cell corresponding to the second area, wherein when a first stroke group including characters extends over the first and second areas, and the first stroke group substantially overlaps the vertical ruled line, a first text box including a first character recognition result regarding the first stroke group is added to the first cell and the second cell, when the first stroke group extends over the first area and the second area, and at least one stroke of the first stroke group overlaps the vertical ruled line or the lateral ruled line, and a part of the first stroke group in the second area is less than a threshold, the first character recognition result is included in the first cell, when the first stroke group extends over the first and second areas, and the first stroke group does not substantially overlap any of the vertical ruled lines, a second character recognition result regarding a second stroke of the first stroke group in the first area is included in the first cell, and a third character recognition result regarding a third stroke of the first stroke group in the second area is included in the second cell, and when the first stroke group extends over the first and second areas, and none of the strokes of the first stroke group substantially overlaps the vertical ruled line, and a stroke indicative of a drawing is present in the first area, a second text box including the second character recognition result is added to the first cell and the second cell.

6. The method of claim 5, wherein when the first stroke group extends over a third area which is substantially surrounded by an imaginary ruled line determined by end portions of the vertical or lateral ruled lines and other ruled lines and a fourth area which is outside the handwritten chart, and none of the strokes of the first stroke group overlaps the imaginary ruled line, a fourth character recognition result regarding a fourth stroke in the third area is included in a third cell corresponding to the third area, and when the first stroke group extends over the third and fourth areas, and at least one stroke of the first stroke group overlaps the imaginary ruled line, a third text box including the first character recognition result is added to the third cell.

7. The method of claim 5, wherein when the first stroke group extends over the first and second areas, and none of the strokes of the first stroke group overlaps any of the vertical ruled lines, and the first stroke group is started from a position at least in a latter half part of the first or second area, a fourth text box including the first character recognition result is added to the first cell and the second cell.

8. The method of claim 5, wherein when the first stroke group extends over the first and second areas, and none of the strokes of the first stroke group overlaps any of the vertical ruled lines, and a fifth stroke which is different from the second stroke is present in a first range of the second stroke in the first area, the second character recognition result and a fifth character recognition result regarding the fifth stroke are included in the first cell, and when the first stroke group extends over the first and second areas, and none of the strokes of the first stroke group overlaps any of the vertical ruled lines, and the fifth stroke is present outside the first range of the second stroke in the first area, a fifth text box including each of the second character recognition result and the fifth character recognition result is added to the first cell and the second cell.

9. A non-transitory computer-readable storage medium having stored thereon a computer program which is executable by a computer, the computer program comprising instructions capable of causing the computer to execute functions of:

displaying a handwritten chart including handwritten strokes on a screen, the strokes including three or more vertical ruled lines and two or more lateral ruled lines, the vertical and lateral ruled lines forming at least a first area and a second area surrounded by the vertical and lateral ruled lines; and executing a process for outputting a chart object corresponding to the handwritten chart, the chart object including a first cell corresponding to the first area and a second cell corresponding to the second area, wherein when a first stroke group including characters extends over the first and second areas, and the first stroke group substantially overlaps the vertical ruled line, a first text box including a first character recognition result regarding the first stroke group is added to the first cell and the second cell, when the first stroke group extends over the first and second areas, and at least one stroke of the first stroke group overlaps the vertical ruled line or the lateral ruled line, and a part of the first stroke group in the second area is less than a threshold, the first character recognition result is included in the first cell, when the first stroke group extends over the first and second areas, and the first stroke group does not substantially overlap any of the vertical ruled lines, a second character recognition result regarding a second stroke of the first stroke group in the first area is included in the first cell, and a third character recognition result regarding a third stroke of the first stroke group in the second area is included in the second cell, and when the first stroke group extends over the first and second areas, and none of the strokes of the first stroke group substantially overlaps the vertical ruled line or the lateral ruled line, and a stroke indicative of a drawing is present in the first area, a second text box including the second character recognition result is added to the first cell and the second cell.

10. The storage medium of claim 9, wherein
when the first stroke group extends over a third area which is substantially surrounded by an imaginary ruled line determined by end portions of the vertical or lateral ruled lines and other ruled lines and a fourth area which is outside the handwritten chart, and none of the strokes of the first stroke group overlaps the imaginary ruled line, a fourth character recognition result regarding a fourth stroke in the third area is included in a third cell corresponding to the third area, and when the first stroke group extends over the third and fourth areas, and at least one stroke of the first stroke group overlaps the imaginary ruled line, a third text box including the first character recognition result is added to the third cell.

11. The storage medium of claim 9, wherein
when the first stroke group extends over the first and second areas, and none of the strokes of the first stroke group overlaps any of the vertical ruled lines, and the first stroke group is started from a position at least in a latter half part of the first or second area, a fourth text box including the first character recognition result is added to the first cell and the second cell.

12. The storage medium of claim 9, wherein
when the first stroke group extends over the first and second areas, and none of the strokes of the first stroke group overlaps any of the vertical ruled lines, and a fifth stroke which is different from the second stroke is present in a first range of the second stroke in the first area, the second character recognition result and a fifth character recognition result regarding the fifth stroke are included in the first cell, and when the first stroke group extends over the first and second ranges, and none of the strokes of the first stroke group overlaps any of the vertical ruled lines, and the fifth stroke is present outside the first range of the second stroke in the first area, a fifth text box including each of the second character recognition result and the fifth character recognition result is added to the first cell and the second cell.

* * * * *